US012253033B2

(12) United States Patent
Minas et al.

(10) Patent No.: US 12,253,033 B2
(45) Date of Patent: Mar. 18, 2025

(54) HYDROGEN FUEL LEAK DETECTION SYSTEM FOR A VEHICLE

(71) Applicant: General Electric Company, Schenectady, NY (US)

(72) Inventors: Constantinos Minas, Slingerlands, NY (US); Sean Christopher Binion, Loveland, OH (US)

(73) Assignee: General Electric Company, Evendale, OH (US)

( * ) Notice: Subject to any disclaimer, the term of this patent is extended or adjusted under 35 U.S.C. 154(b) by 253 days.

(21) Appl. No.: 17/959,400

(22) Filed: Oct. 4, 2022

(65) Prior Publication Data

US 2024/0110524 A1 Apr. 4, 2024

(51) Int. Cl.
*B60H 1/00* (2006.01)
*F02C 7/232* (2006.01)
(Continued)

(52) U.S. Cl.
CPC ............... *F02C 9/28* (2013.01); *B60H 1/008* (2013.01); *B60H 1/00821* (2013.01);
(Continued)

(58) Field of Classification Search
None
See application file for complete search history.

(56) References Cited

U.S. PATENT DOCUMENTS 2,195,213 A 3/1940 Heigis
2,592,974 A 4/1952 Sulfrian
(Continued)

FOREIGN PATENT DOCUMENTS

CA 885178 A 11/1971
CN 1627063 A 6/2005
(Continued)

OTHER PUBLICATIONS

Drafts, Acoustic Wave Technology Sensors, Fierce Electronics, Oct. 2000, 17 Pages.
(Continued)

*Primary Examiner* — Suman K Nath
*Assistant Examiner* — Nigel H Plumb
(74) *Attorney, Agent, or Firm* — Dority & Manning, P.A.

(57) ABSTRACT

A system for detecting hydrogen leaks within a vehicle includes a hydrogen sensor for generating data indicative of a level of hydrogen present within a compartment of the vehicle and a computing system. The computing system determines at least one of the level of hydrogen present within the compartment or a rate of change of the level of hydrogen present within the compartment and compares the determined at least one of the level of hydrogen present within the compartment or the rate of change of the level of hydrogen present within the compartment to a threshold value. When the determined at least one of the level of hydrogen present within the compartment or the rate of change of the level of hydrogen present within the compartment exceeds the threshold value, the computing system initiates a control action for reducing the level of hydrogen present within the compartment.

16 Claims, 12 Drawing Sheets

(51) Int. Cl.
    *F02C 9/28*     (2006.01)
    *F02C 9/40*     (2006.01)
    *G01M 3/04*     (2006.01)

(52) U.S. Cl.
    CPC ................ *F02C 7/232* (2013.01); *F02C 9/40* (2013.01); *G01M 3/04* (2013.01)

(56) References Cited

U.S. PATENT DOCUMENTS

| | | | |
|---|---|---|---|
| 2,937,698 A | 5/1960 | Greenlee | |
| 2,962,195 A | 11/1960 | Greenlee | |
| 2,984,978 A | 5/1961 | Griffith | |
| 3,039,305 A | 6/1962 | Hall | |
| 3,252,610 A | 5/1966 | Greenlee | |
| 3,392,220 A | 7/1968 | Jennings | |
| 4,049,221 A | 9/1977 | Fountain | |
| 4,254,618 A | 3/1981 | Elovic | |
| 4,269,376 A | 5/1981 | Haux et al. | |
| 4,300,354 A | 11/1981 | Buchs et al. | |
| 4,552,325 A | 11/1985 | Bruensicke | |
| 4,622,824 A | 11/1986 | Creedon | |
| 4,756,854 A | 7/1988 | Wegrzyn | |
| 4,784,959 A | 11/1988 | Wegrzyn | |
| 4,821,907 A | 4/1989 | Castles et al. | |
| 4,822,743 A | 4/1989 | Wegrzyn | |
| 4,837,541 A | 6/1989 | Pelc | |
| 4,844,743 A | 7/1989 | Koblenzer et al. | |
| 4,961,325 A | 10/1990 | Halvorson et al. | |
| 5,548,962 A | 8/1996 | Luger et al. | |
| 5,582,016 A | 12/1996 | Gier et al. | |
| 5,746,397 A | 5/1998 | DeField et al. | |
| 6,651,932 B2 | 11/2003 | Diehl et al. | |
| 6,978,621 B2 | 12/2005 | Bunker et al. | |
| 6,984,465 B2 | 1/2006 | Canepa et al. | |
| 7,117,663 B2 | 10/2006 | Knapp | |
| 7,192,459 B2 | 3/2007 | Puri et al. | |
| 7,281,681 B2 | 10/2007 | MacCready et al. | |
| 7,287,558 B2 | 10/2007 | Hobbs | |
| 7,752,885 B2 | 7/2010 | Huang | |
| 7,806,365 B2 | 10/2010 | Miller et al. | |
| 7,810,669 B2 | 10/2010 | Westenberger | |
| 7,811,688 B2 | 10/2010 | Flynn et al. | |
| 7,915,047 B2 | 3/2011 | Thorn et al. | |
| 8,028,853 B2 | 10/2011 | Hobbs et al. | |
| 8,028,951 B2 | 10/2011 | MacCready et al. | |
| 8,113,708 B2 | 2/2012 | Albertson | |
| 8,319,833 B2 | 11/2012 | Weinstein et al. | |
| 8,394,553 B2 | 3/2013 | Flynn et al. | |
| 8,430,237 B2 | 4/2013 | Westenberger et al. | |
| 8,430,360 B2 | 4/2013 | Schwarze et al. | |
| 8,470,933 B2 | 6/2013 | Thorn et al. | |
| 8,778,545 B2 | 7/2014 | Lehar et al. | |
| 8,789,379 B2 | 7/2014 | Watts | |
| 8,858,679 B2 | 10/2014 | Buhrman et al. | |
| 8,950,195 B2 | 2/2015 | Watts | |
| 9,022,730 B2 | 5/2015 | Vysohlid et al. | |
| 9,061,788 B2 | 6/2015 | Veksler et al. | |
| 9,118,054 B2 | 8/2015 | Gummalla et al. | |
| 9,239,008 B2 | 1/2016 | Ekanayake et al. | |
| 9,269,205 B1 | 2/2016 | Lamkin et al. | |
| 9,318,757 B2 | 4/2016 | Koenig et al. | |
| 9,464,573 B2 | 10/2016 | Remy et al. | |
| 9,604,730 B2 | 3/2017 | Hagh et al. | |
| 9,676,491 B2 | 6/2017 | Epstein et al. | |
| 9,683,910 B2 | 6/2017 | Ekanayake et al. | |
| 9,834,315 B2 | 12/2017 | Lo et al. | |
| 9,859,801 B2 | 1/2018 | Wangemann et al. | |
| 9,897,041 B2 | 2/2018 | Hoffjann et al. | |
| 9,954,414 B2 | 4/2018 | Cunningham et al. | |
| 9,964,113 B2 | 5/2018 | Westberg et al. | |
| 9,982,843 B2 | 5/2018 | Kawai | |
| 10,082,246 B2 | 9/2018 | Aceves et al. | |
| 10,112,486 B2 | 10/2018 | Ban et al. | |
| 10,179,308 B2 | 1/2019 | Schaeffer et al. | |
| 10,222,291 B2 | 3/2019 | Thompson et al. | |
| 10,260,678 B2 | 4/2019 | Christ | |
| 10,286,336 B2 | 5/2019 | Durward | |
| 10,286,408 B2 | 5/2019 | Lam et al. | |
| 10,312,536 B2 | 6/2019 | Rheaume | |
| 10,386,259 B2 | 8/2019 | Zhang et al. | |
| 10,415,756 B2 | 9/2019 | Moddemann | |
| 10,473,031 B2 | 11/2019 | Ellsworth et al. | |
| 10,578,585 B1 | 3/2020 | Gerardi et al. | |
| 10,584,616 B2 | 3/2020 | Moxon | |
| 10,584,635 B2 | 3/2020 | Armstrong et al. | |
| 10,619,569 B2 | 4/2020 | Evetts et al. | |
| 10,800,525 B2 | 10/2020 | Sankrithi et al. | |
| 10,823,066 B2 | 11/2020 | Miller et al. | |
| 11,073,169 B2 | 7/2021 | Thatte | |
| 11,125,165 B2 | 9/2021 | Niergarth et al. | |
| 11,139,491 B2 | 10/2021 | Kwon et al. | |
| 11,241,653 B2 | 2/2022 | Claris | |
| 2006/0169024 A1* | 8/2006 | Shoji .................. | H01M 8/0447 73/23.2 |
| 2006/0257094 A1 | 11/2006 | McEvoy et al. | |
| 2013/0087305 A1* | 4/2013 | Ikeya ................ | H01M 8/04014 165/41 |
| 2013/0139897 A1 | 6/2013 | Kim et al. | |
| 2013/0299501 A1 | 11/2013 | Lee et al. | |
| 2014/0026597 A1 | 1/2014 | Epstein et al. | |
| 2014/0166662 A1 | 6/2014 | Snyder et al. | |
| 2015/0101419 A1 | 4/2015 | Hill et al. | |
| 2015/0266589 A1 | 9/2015 | Blumer et al. | |
| 2019/0003386 A1 | 1/2019 | Stapp | |
| 2019/0009917 A1 | 1/2019 | Anton et al. | |
| 2019/0190041 A1 | 6/2019 | Godula-Jopek et al. | |
| 2020/0294401 A1* | 9/2020 | Kerecsen ............... | G08G 1/205 |
| 2020/0335806 A1* | 10/2020 | Zheng ............... | H01M 8/04761 |
| 2020/0340881 A1 | 10/2020 | Hattori | |
| 2020/0348662 A1 | 11/2020 | Cella et al. | |
| 2021/0062974 A1 | 3/2021 | Tezuka et al. | |
| 2021/0098805 A1 | 4/2021 | Poirier et al. | |
| 2021/0148283 A1 | 5/2021 | Niergarth et al. | |
| 2021/0151783 A1 | 5/2021 | Miftakhov | |
| 2021/0340908 A1 | 11/2021 | Boucher et al. | |
| 2022/0009648 A1 | 1/2022 | Clarke et al. | |

FOREIGN PATENT DOCUMENTS

| | | |
|---|---|---|
| CN | 200990131 Y | 12/2007 |
| CN | 201120842 Y | 9/2008 |
| CN | 207712306 U | 8/2018 |
| CN | 109026710 A | 12/2018 |
| CN | 110529726 A | 12/2019 |
| DE | 102017223803 A | 6/2019 |
| EP | 3048281 A1 | 7/2016 |
| EP | 3805107 A1 | 4/2021 |
| FR | 2615903 A1 | 12/1988 |
| FR | 3096029 A1 | 11/2020 |
| JP | 2007024015 A | 2/2007 |
| JP | 2014025741 A | 2/2014 |
| JP | 2014084825 A | 5/2014 |
| JP | 2018131944 A | 8/2018 |
| KR | 20210125123 A | 10/2021 |
| WO | WO2005124246 A1 | 12/2005 |
| WO | WO2009018898 A2 | 2/2009 |
| WO | WO2011119338 A1 | 9/2011 |

OTHER PUBLICATIONS

Ke et al., Detecting Phase Transitions in Supercritical Mixtures: An Enabling Tool for Greener Chemical Reactions, Proceedings of the Royal Society A, vol. 466, 2010, pp. 2799-2812.

Ke et al., The Phase Equilibrium and Density Studies of the Ternary Mixtures of $CO_2 + Ar + N_2$ and $CO_2 + Ar + H_2$, Systems Relevance to CCS Technology, International Journal of Greenhouse Gas Control, vol. 56, Jan. 2017, pp. 55-56.

Fandino et al., Phase Behavior of ($CO_2 + H_2$) and ($CO_2 + N_2$) at Temperatures Between (218.15 and 303.15) K at Pressures up to 15 MPa, International Journal of Greenhouse Gas Control, vol. 36, May 2015, 39 Pages.

(56) References Cited

OTHER PUBLICATIONS

Fehrm, Bjorn's Corner: The Challenges of Hydrogen. Part 29. Gas Turbine Heat Management, Mar. 19, 2021, 3 Pages. Accessed on-line at: https://leehamnews.com/2021/03/19/bjorns-corner-the-challenges-of-hydrogen-part-29-gas-turbine-heat-management/.

Gonzalez-Portillo, A New Concept in Thermal Engineering Optimization: The Pericritical Cycle with Multi-Heating and Its Application to Concentrating Solar Power, Sep. 2019, 233 Pages. (Abstract Only) Retrieved Mar. 7, 2022 from Weblink: https://oa.upm.es/56492/.

Goos et al., Phase Diagrams of CO2 and CO2—N2 Gas Mixtures and Their Application in Compression Processes, Energy Procedia, vol. 4, 2011, pp. 3778-3785.

Javed et al., Thermodynamic Speed of Sound Data for Liquid and Supercritical Alcohols, Journal of Chemical & Engineering Data, vol. 64, No. 3, 2019, pp. 1035-1044.

Legoix et al., Phase Equilibria of the CH4—CO2 Binary and the CH4—CO2—H2O Ternary Mixtures in the Presence of a CO2-Rich Liquid Phase, 10122034, Energies, vol. 10, 2017, 11 Pages.

Oag et al., Probing the Vapor-Liquid Phase Behaviors of Near-Critical and Supercritical Fluids Using a Shear Mode Piezoelectric Sensor, Analytical Chemistry, vol. 75, No. 3, Feb. 1, 2003, p. 479-485.

Park et al., Measurements of Density and Sound Speed in Mixtures Relevant to Supercritical CO2 Cycles, Journal of Energy Resources Technology, vol. 142, Oct. 2020, 7 Pages.

Wetenhall et al., The Effect of CO2 Purity on the Development of Pipeline Networks for Carbon Capture and Storage Schemes, International Journal of Greenhouse Gas Control, vol. 30, 2014, pp. 197-211.

Zheng et al., The Application of Carbon Fiber Composites in Cryotank, Solidification, IntechOpen, 2018, 21 Pages. (Abstract Only) Retrieved from Website: www.intechopen.com/chapters/58970.

\* cited by examiner

HYDROGEN FUEL LEAK DETECTION SYSTEM FOR A VEHICLE

FIELD

The present disclosure relates generally to a hydrogen fuel system for a vehicle, such as a hydrogen fuel system for an aeronautical vehicle.

BACKGROUND

The aircraft includes a fuel delivery assembly that generally includes a fuel tank and one or more fuel lines that extend between the fuel tank and the aircraft engine(s). Traditional aircraft engines are powered by aviation turbine fuel, which is typically a combustible hydrocarbon liquid fuel, such as a Kerosene-type fuel, having a desired carbon number. The aviation turbine fuel stays in a liquid phase through most ambient operating conditions for aircraft.

It has been argued that improvements in emissions from conventional aircraft having aircraft engines powered by aviation turbine fuel may be achieved by utilizing a hydrogen fuel. Hydrogen fuel has an extremely low boiling point and, thus, may be in gaseous under certain operating conditions.

These and other issues may make it difficult to effectively use hydrogen fuel for aircraft engines. Accordingly, technological improvements facilitating use of hydrogen fuel in aircraft engines in view of these and other issues would be welcomed.

BRIEF DESCRIPTION OF THE DRAWINGS

A full and enabling disclosure of the present disclosure, including the best mode thereof, directed to one of ordinary skill in the art, is set forth in the specification, which makes reference to the appended figures, in which.

DETAILED DESCRIPTION

Figure 1:
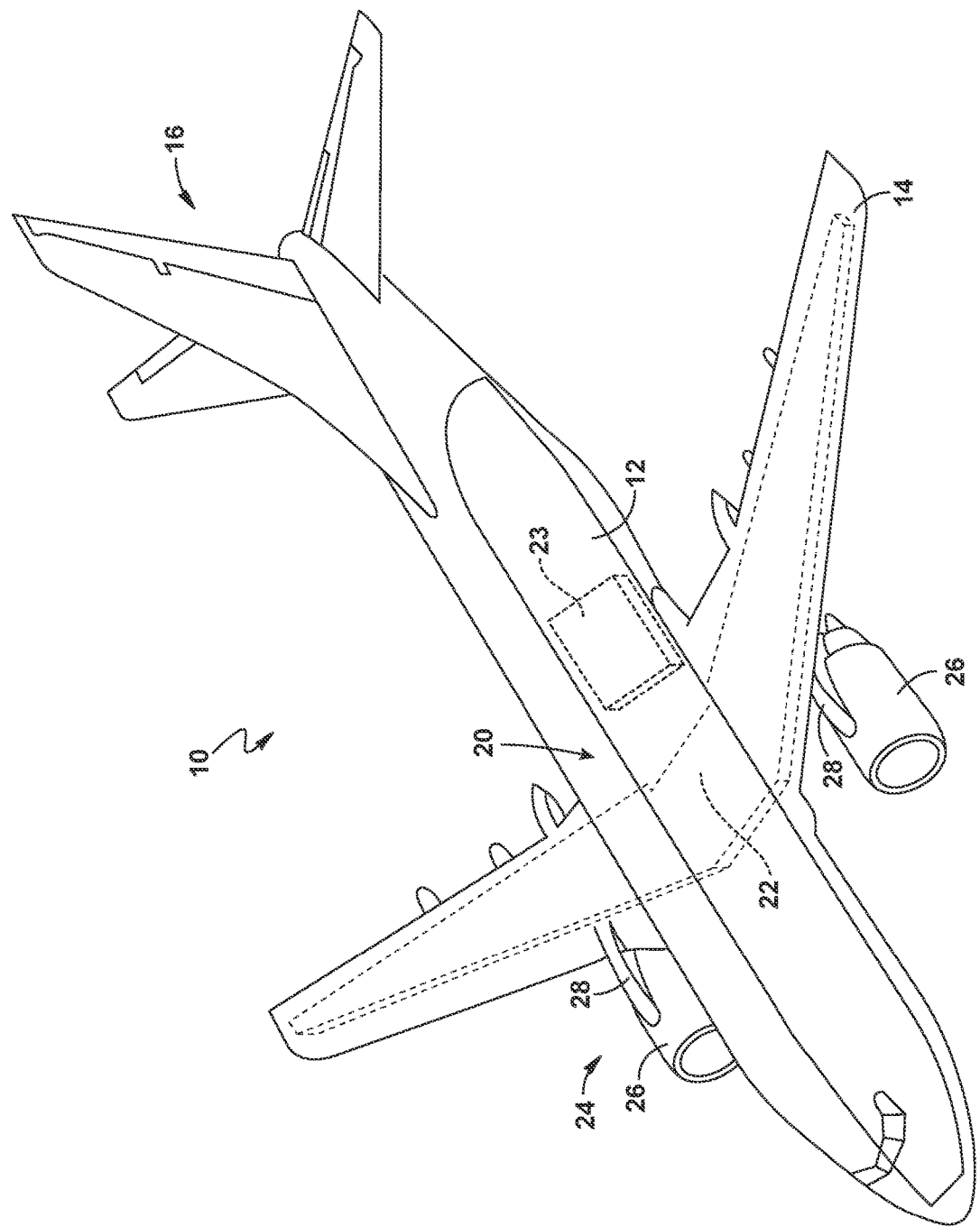
FIG. 1 is a schematic view of an aircraft having a fuel system in accordance with an exemplary embodiment of the present disclosure.

Reference will now be made in detail to present embodiments of the disclosure, one or more examples of which are illustrated in the accompanying drawings. The detailed description uses numerical and letter designations to refer to features in the drawings. Like or similar designations in the drawings and description have been used to refer to like or similar parts of the disclosure.

The word "exemplary" is used herein to mean "serving as an example, instance, or illustration." Any implementation described herein as "exemplary" is not necessarily to be construed as preferred or advantageous over other implementations. Additionally, unless specifically identified otherwise, all embodiments described herein should be considered exemplary.

As used herein, the terms "first," "second," and "third" may be used interchangeably to distinguish one component from another and are not intended to signify location or importance of the individual components.

The terms "upstream" and "downstream" refer to the relative direction with respect to a flow in a pathway. For example, with respect to a fluid flow, "upstream" refers to the direction from which the fluid flows, and "downstream" refers to the direction to which the fluid flows. However, the terms "upstream" and "downstream" as used herein may also refer to a flow of electricity.

The terms "coupled," "fixed," "attached to," and the like refer to both direct coupling, fixing, or attaching, as well as indirect coupling, fixing, or attaching through one or more intermediate components or features, unless otherwise specified herein.

The singular forms "a," "an," and "the" include plural references unless the context clearly dictates otherwise.

The term "at least one of" in the context of, e.g., "at least one of A, B, and C" refers only A, only B, only C, or any combination of A, B, and C.

Approximating language, as used herein throughout the specification and claims, is applied to modify any quantitative representation that could permissibly vary without resulting in a change in the basic function to which it is related. Accordingly, a value modified by a term or terms, such as "about," "approximately," and "substantially," are not to be limited to the precise value specified. In at least some instances, the approximating language may correspond to the precision of an instrument for measuring the value, or the precision of the methods or machines for constructing or manufacturing the components and/or systems. In at least some instances, the approximating language may correspond to the precision of an instrument for measuring the value, or the precision of the methods or machines for constructing or manufacturing the components and/or systems. For example, the approximating language may refer to being within a 1, 2, 4, 5, 10, 15, or 20 percent margin in either individual values, range(s) of values and/or endpoints defining range(s) of values.

Here and throughout the specification and claims, range limitations are combined and interchanged, such ranges are identified and include all the sub-ranges contained therein unless context or language indicates otherwise. For example, all ranges disclosed herein are inclusive of the endpoints, and the endpoints are independently combinable with each other.

The term "gas turbine engine" refers to an engine having a turbomachine as all or a portion of its power source. Example gas turbine engines include turbofan engines, turboprop engines, turbojet engines, turboshaft engines, etc., as well as hybrid-electric versions of one or more of these engines.

The term "combustion section" refers to any heat addition system for a turbomachine. For example, the term combustion section may refer to a section including one or more of a deflagrative combustion assembly, a rotating detonation combustion assembly, a pulse detonation combustion assembly, or other appropriate heat addition assembly. In certain example embodiments, the combustion section may include an annular combustor, a can combustor, a cannular combustor, a trapped vortex combustor (TVC), or other appropriate combustion system, or combinations thereof.

The terms "low" and "high," or their respective comparative degrees (e.g., —er, where applicable), when used with a compressor, a turbine, a shaft, or spool components, etc. each refer to relative speeds within an engine unless otherwise specified. For example, a "low turbine" or "low speed turbine" defines a component configured to operate at a rotational speed, such as a maximum allowable rotational speed, lower than a "high turbine" or "high speed turbine" at the engine.

In general, the present disclosure is directed to a system and method for detecting hydrogen leaks within a vehicle, such as an aeronautical vehicle (e.g., an aircraft). As will be described below, the vehicle includes one or more component in which hydrogen is stored or through which hydrogen flows. For example, such vehicle component(s) may in a hydrogen fuel tank(s), a hydrogen delivery conduit(s), or a gas turbine engine(s) associated with the vehicle. The vehicle component(s) is, in turn, positioned within one or more compartments of the vehicle that are fluidly isolated from each other.

In several embodiments, a computing system of the disclosed system is configured to initiate one or more control actions associated with reducing the level of hydrogen present within one or more of the compartment of the vehicle when a leak detected in such compartment(s). Specifically, the computing system may be configured to receive data indicative of the level of hydrogen present within the compartment(s) from one or more hydrogen sensors. Furthermore, the computing system may be configured to the level of hydrogen present within the compartment(s) based on the received hydrogen sensor data. Thereafter, when the determined level of hydrogen present within a compartment exceeds an associated threshold value (thereby indicating that the hydrogen level within that compartment is too high), the computing system is configured to initiate one or more control actions to reduce the level of hydrogen present within that compartment. The threshold range may be from 10 ppm to 500 ppm, such as 20 ppm to 100 ppm, 30 ppm to 80 ppm, 40 ppm to 50 ppm, and/or the like. Additionally, or as an alternative, the computing system may determine the rate of change of the level of hydrogen present within the compartment based on the received hydrogen sensor data. Thereafter, when the determined rate of change of the level of hydrogen present within the compartment exceeds an associated threshold value (thereby indicating a large leak), the computing system is configured to initiate one or more control actions to reduce the level of hydrogen present within that compartment.

Various control actions to reduce the level of hydrogen present within the compartment(s) may be initiated in accordance with aspects of the present subject. More specifically, in one embodiment, the control action(s) may include increasing the ventilation provided to the compartment. For example, in such an embodiment, the computing system may be configured to control the operation of a ventilation device such the flow of air permitted between the compartment and the location outside of the compartment is increased. Moreover, in another embodiment, the control action(s) may include activating a quick release panel(s) associated with the compartment(s). For example, in such an embodiment, the computing system may be configured to activate an actuator(s) to puncture a frangible portion(s) of the quick release panel(s). Alternatively, frangible portion(s) may puncture when the pressure within the compartment(s) exceeds a predetermined pressure value. In addition, in a further embodiment, control action(s) may include opening a vent valve(s) configured to discharge hydrogen from the vehicle component(s) to reduce the pressure of the hydrogen within the component(s).

Initiating such control action(s) when the level of hydrogen present within the compartment(s) or the rate of change of the level of hydrogen present within the compartment(s) exceeds an associated threshold value improves the operation of the vehicle. More specifically, such control action(s) allow for continued operation of the engine(s) of the vehicle when a leak occurs within the hydrogen fuel system by reducing the level of hydrogen within the compartment(s) of the vehicle and/or reducing the magnitude of the leak. Furthermore, such control action(s) allow for hydrogen to continue to flow through the hydrogen fuel system by activating redundant components.

The disclosed system allow for quicker reduction of hydrogen levels within the compartment(s) than conventional systems, thereby allowing for continued operation of the vehicle even when a hydrogen leak is present.

Other example embodiments are described herein below and may be disclosed with reference to the figures.

Referring now to FIG. 1, a perspective view of a vehicle of the present disclosure is provided. Specifically, for the exemplary embodiment of FIG. 1, the vehicle is configured as an aeronautical vehicle, or aircraft 10. The exemplary aircraft 10 has a fuselage 12, wings 14 attached to the fuselage 12, and an empennage 16. However, the present subject matter is not limited to aeronautical vehicles and can be used on any other suitable type of vehicle or non-vehicle.

The exemplary aircraft 10 further includes a fuel system 20 having a liquid hydrogen fuel tank 22 for holding a first portion of hydrogen fuel in a liquid phase. In the exemplary aircraft 10 shown in FIG. 1, at least a portion of the liquid hydrogen fuel tank 22 is located in a wing 14 of the aircraft 10. In some embodiments, however, the liquid hydrogen fuel tank 22 may be located at other suitable locations in the fuselage 12 or the wing 14. It will be appreciated that the first portion of hydrogen fuel is stored in the liquid hydrogen fuel tank 22 at a relatively low temperature. For example, the first portion of hydrogen fuel may be stored in the liquid hydrogen fuel tank 22 at about −253 degrees Celsius or less at an atmospheric pressure, or at other temperatures and pressures to maintain the hydrogen fuel substantially in the liquid phase. The liquid hydrogen fuel tank 22 may be made from known materials such as titanium, Inconel, aluminum, or composite materials.

For the exemplary embodiment of FIG. 1, the exemplary fuel system 20 further includes a gaseous hydrogen fuel tank 23 for holding a second portion of hydrogen fuel in a gaseous phase. Although for the embodiment shown in FIG. 1, the gaseous hydrogen fuel tank 23 is positioned within the fuselage 12 of the aircraft 10, in other embodiments, the gaseous hydrogen fuel tank 23 may be positioned at any other suitable location. In at least certain exemplary aspects, the gaseous hydrogen fuel tank 23 may include a plurality of gaseous hydrogen fuel tank 23 (in which case the term "gaseous hydrogen fuel tank" refers to all of the gaseous hydrogen fuel tanks). Further, the gaseous hydrogen fuel tank 23 may be configured to store the second portion of hydrogen fuel at an increased pressure so as to reduce the necessary size of the gaseous hydrogen fuel tank 23 within the aircraft 10.

The aircraft 10 further includes a propulsion system 24 that produces a propulsive thrust required to propel the aircraft 10 in flight, during taxiing operations, etc. Although the propulsion system 24 is shown attached to the wing(s) 14 in FIG. 1, in other embodiments it may additionally or alternatively include one or more aspects coupled to other parts of the aircraft 10, such as, for example, the empennage 16, the fuselage 12, or both.

For the exemplary aspect depicted, the propulsion system 24 includes an engine, and more specifically includes a pair of engines. More specifically, still, each of the engines in the pair of engines is configured as a turbine engine 26 mounted to one of the respective wings 14 of the aircraft 10 in an under-wing configuration through a respective pylon 28. Each turbine engine 26 is capable of selectively generating a propulsive thrust for the aircraft 10. The amount of propulsive thrust may be controlled at least in part based on a volume (or more specifically a mass flowrate) of fuel provided to the gas turbine engines 26 via the fuel system 20.

Figure 2:
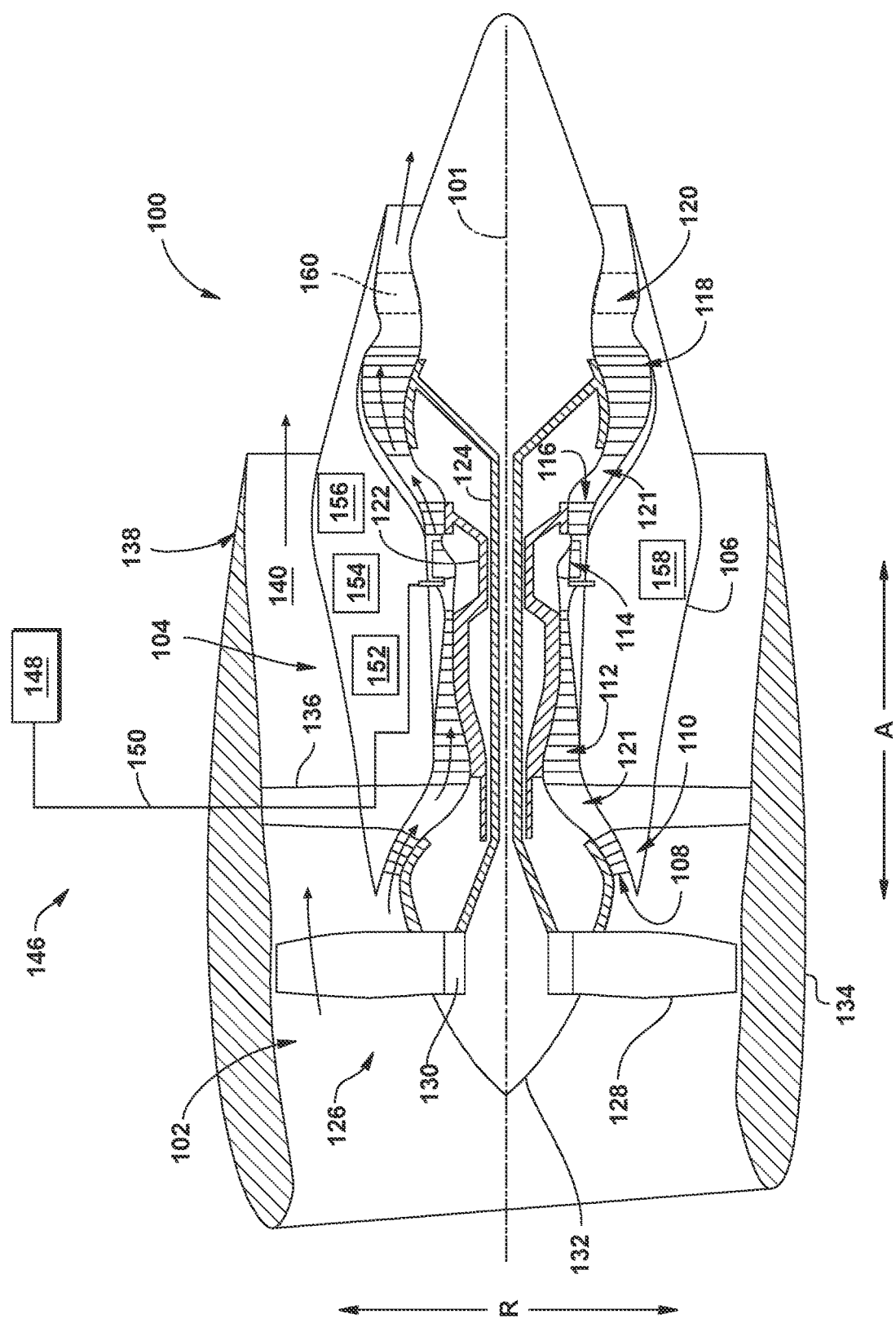
FIG. 2 is a schematic, cross-sectional view of a gas turbine engine in accordance with an exemplary embodiment of the present disclosure.

Referring now to FIG. 2, a schematic, cross-sectional view of a gas turbine engine in accordance with an exemplary embodiment of the present disclosure is provided. For example, the exemplary gas turbine engine of FIG. 2 may be incorporated into propulsion system 24 described above with reference to FIG. 1 as one of the gas turbine engines 26.

For the embodiment depicted, the engine is configured as a high bypass turbofan engine 100. As shown in FIG. 1, the turbofan engine 100 defines an axial direction A (extending parallel to a longitudinal centerline 101 provided for reference), a radial direction R, and a circumferential direction (extending about the axial direction A; not depicted in FIG. 2). In general, the turbofan engine 100 includes a fan section 102 and a turbomachine 104 disposed downstream from the fan section 102.

The exemplary turbomachine 104 depicted generally includes a substantially tubular outer casing 106 that defines an annular inlet 108. The outer casing 106 encases, in serial flow relationship, a compressor section including a booster or low pressure (LP) compressor 110 and a high pressure (HP) compressor 112; a combustion section 114; a turbine section including a high pressure (HP) turbine 116 and a low pressure (LP) turbine 118; and a jet exhaust nozzle section 120. The compressor section, combustion section 114, and turbine section together define at least in part a core air flow path 121 extending from the annular inlet 108 to the jet nozzle exhaust section 120. The turbofan engine 100 further includes one or more drive shafts. More specifically, the turbofan engine includes a high pressure (HP) shaft or spool 122 drivingly connecting the HP turbine 116 to the HP compressor 112, and a low pressure (LP) shaft or spool 124 drivingly connecting the LP turbine 118 to the LP compressor 110.

For the embodiment depicted, the fan section 102 includes a fan 126 having a plurality of fan blades 128 coupled to a disk 130 in a spaced apart manner. The fan blades 128 and disk 130 are together rotatable about the longitudinal centerline 101 by the LP shaft 124. The disk 130 is covered by rotatable front hub 132 aerodynamically contoured to promote airflow through the plurality of fan blades 128. Further, an annular fan casing or nacelle 134 is provided, circumferentially surrounding the fan 126 and/or at least a portion of the turbomachine 104. The nacelle 134 is supported relative to the turbomachine 104 by a plurality of circumferentially spaced outlet guide vanes 136. A downstream section 138 of the nacelle 134 extends over an outer portion of the turbomachine 104 so as to define a bypass airflow passage 140 therebetween.

Referring still to FIG. 2, the turbofan engine 100 is operable with a fuel system 146 for receiving a flow of fuel from the fuel system 146. The fuel system 146 may be configured similarly to the fuel system 20 of FIG. 1. Accordingly, the fuel system 146 generally includes a fuel tank 148 and a fuel delivery assembly 150. The fuel delivery assembly 150 provides a fuel flow from the fuel tank 148 to the turbofan engine 100, and more specifically to a fuel manifold (not labeled) of the combustion section 114 of the turbomachine 104 of the turbofan engine 100.

Moreover, as is depicted schematically, the exemplary turbofan engine 100 further includes various accessory systems to aid in the operation of the turbofan engine 100 and/or an aircraft including the turbofan engine 100. For example, the exemplary turbofan engine 100 further includes a main lubrication system 152 configured to provide a lubricant to, e.g., various bearings and gear meshes in the compressor section, the turbine section, the HP spool 122, the LP spool 124, etc. The lubricant provided by the main lubrication system 152 may increase the useful life of such components and may remove a certain amount of heat from such components. Additionally, the turbofan engine 100 includes a compressor cooling air (CCA) system 154 for providing air from one or both of the HP compressor 112 or LP compressor 110 to one or both of the HP turbine 116 or LP turbine 118. Moreover, the exemplary turbofan engine 100 includes an active thermal clearance control (ACC) system 156 for cooling a casing of the turbine section to maintain a clearance between the various turbine rotor blades and the turbine casing within a desired range throughout various engine operating conditions. Furthermore, the exemplary turbofan engine 100 includes a generator lubrication system 158 for providing lubrication to an electronic generator (not shown), as well as cooling/heat removal for the electronic generator. The electronic generator may provide electrical power to, e.g., a startup electric motor for the turbofan engine 100 and/or various other electronic components of the turbofan engine 100 and/or an aircraft including the turbofan engine 100.

Heat from these accessory systems 152, 154, 156, 158, and other accessory systems may be provided to various heat sinks as waste heat from the turbofan engine 100 during operation (e.g., to various heat exchangers or vaporizers, as discussed below). Additionally, for the embodiment depicted, the turbofan engine 100 further includes one or more heat exchangers 160 within, e.g., the turbine section or exhaust section 120 for extracting waste heat from an airflow therethrough, such that the waste heat may be utilized to add heat to various heat sinks as waste heat during operation (e.g., to various vaporizers, as discussed below).

It will be appreciated, however, that the exemplary turbofan engine 100 depicted in FIG. 2 is provided by way of example only. In other exemplary embodiments, any other suitable engine may be utilized with aspects of the present disclosure. For example, in other embodiments, the engine may be any other suitable gas turbine engine, such as a turboshaft engine, turboprop engine, turbojet engine, etc. In such a manner, it will further be appreciated that in other embodiments the gas turbine engine may have any other suitable configuration, such as any other suitable number or arrangement of shafts, compressors, turbines, fans, etc. Further, although the exemplary gas turbine engine depicted in FIG. 2 is shown schematically as a direct drive, fixed-pitch turbofan engine 100, in other embodiments, a gas turbine engine of the present disclosure may be a geared gas turbine engine (i.e., including a gearbox between the fan 126 and shaft driving the fan, such as the LP shaft 124), may be a variable pitch gas turbine engine (i.e., including a fan 126 having a plurality of fan blades 128 rotatable about their respective pitch axes), etc. Further, still, in alternative embodiments, aspects of the present disclosure may be incorporated into, or otherwise utilized with, any other type of engine, such as reciprocating engines. Additionally, in still other exemplary embodiments, the exemplary turbofan engine 100 may include or be operably connected to any other suitable accessory systems. Additionally, or alternatively, the exemplary turbofan engine 100 may not include or be operably connected to one or more of the accessory systems 152, 154, 156, 158 discussed above.

Figure 3:
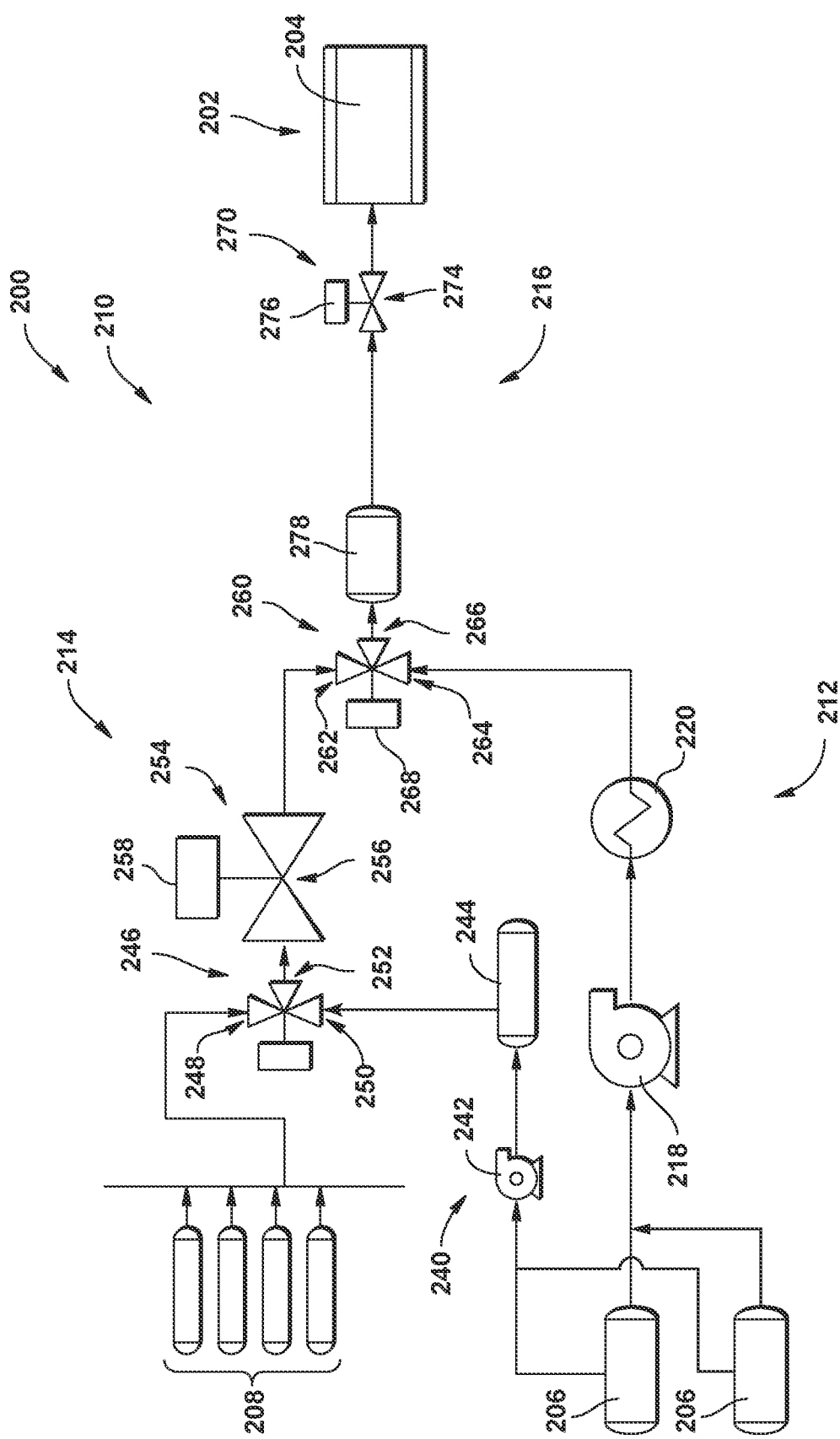
FIG. 3 is a schematic view of a fuel system in accordance with an exemplary aspect of the present disclosure.

Referring now to FIG. 3, a schematic view of a fuel system 200 for a vehicle having an engine 202 (e.g., the aircraft 10 and the turbofan engine 100) in accordance with an exemplary embodiment of the present disclosure is provided. More specifically, in the exemplary embodiment of FIG. 3, the vehicle may be an aeronautical vehicle, such as the exemplary aircraft 10 of FIG. 1, and the engine 202 may be an aeronautical gas turbine engine, such as the exemplary engines 26 of FIG. 1 and/or the exemplary turbofan engine 100 of FIG. 2. As will be appreciated, the engine 202 generally includes a combustion section having a combustor 204 with, e.g., one or more fuel nozzles (not depicted).

It will be appreciated, however, that in other embodiments, the vehicle may be any other suitable land or aeronautical vehicle and the engine 202 may be any other suitable engine mounted to or within the vehicle in any suitable manner. Additionally, the subject matter may be used with non-vehicles as well.

The exemplary fuel system 200 depicted is generally a hydrogen fuel system configured to store a hydrogen fuel and provide the hydrogen fuel to the engine 202.

In the embodiment shown, the fuel system 200 generally includes a pair of liquid hydrogen fuel tanks 206 for holding a first portion of hydrogen fuel in a liquid phase. The liquid hydrogen fuel tanks 206 may more specifically be configured to store the first portion of hydrogen fuel substantially completely in the liquid phase. For example, the liquid hydrogen fuel tanks 206 may be configured to store the first portion at a temperature of about −253° C. or less, and at a pressure greater than about one bar and less than about 10 bar, such as between about three bar and about five bar, or at other temperatures and pressures to maintain the hydrogen fuel substantially in the liquid phase.

It will be appreciated that as used herein, the term "substantially completely" as used to describe a phase of the hydrogen fuel refers to at least 99% by mass of the described portion of the hydrogen fuel being in the stated phase, such as at least 97.5%, such as at least 95%, such as at least 92.5%, such as at least 90%, such as at least 85%, such as at least 75% by mass of the described portion of the hydrogen fuel being in the stated phase.

The fuel system 200 further includes a gaseous hydrogen fuel tank 208 configured to store a second portion of hydrogen fuel in a gaseous phase. The gaseous hydrogen fuel tank 208 may be configured to store the second portion of hydrogen fuel at an increased pressure so as to reduce a necessary size of the gaseous hydrogen fuel tank 208 within the aircraft 10. For example, in certain exemplary aspects, the gaseous hydrogen fuel tank 208 may be configured to store the second portion of hydrogen fuel at a pressure of at least about 100 bar, such as at least about 200 bar, such as at least about 400 bar, such as at least about 600 bar, such as at least about 700 bar, and up to about 1,000 bar. The gaseous hydrogen fuel tank 208 may be configured to store the second portion of the hydrogen fuel at a temperature within about 50° C. of an ambient temperature, or between about −50° C. and about 100° C.

It will be appreciated, that for the embodiment depicted, the gaseous hydrogen fuel tank 208 is more specifically a plurality of gaseous hydrogen fuel tank 208. The gaseous hydrogen fuel tank 208 may be configured as a plurality of gaseous hydrogen fuel tank 208 to reduce an overall size and weight that would otherwise be needed to contain the desired volume of the second portion of hydrogen fuel in the gaseous phase at the desired pressures.

As will further be appreciated, a substantial portion of the total hydrogen fuel storage capacity of the fuel system 200 is provided by the liquid hydrogen fuel tank 206. For example, in certain exemplary embodiments, the fuel system 200 defines a maximum fuel storage capacity. The liquid hydrogen fuel tank 206 may provide more than 50% of the maximum fuel storage capacity (in kilograms), with the remaining portion provided by the gaseous hydrogen fuel tank 208. For example, in certain exemplary aspects, the liquid hydrogen fuel tank 206 may provide at least about 60% of the maximum fuel storage capacity, such as at least about 70% of the maximum fuel storage capacity, such as at least about 80% of the maximum fuel storage capacity, such as up to about 98% of the maximum fuel storage capacity, such as up to about 95% of the maximum fuel storage capacity. The gaseous hydrogen fuel tank 208 may be configured to provide the remaining fuel storage capacity, such as at least about 2% of the maximum fuel storage capacity, such as at least about 5% of the maximum fuel storage capacity, such as at least about 10% of the maximum fuel storage capacity, such as at least about 15% of the maximum fuel storage capacity, such as at least about 20% of the maximum fuel storage capacity, such as up to 50% of the maximum fuel storage capacity, such as up to about 40% of the maximum fuel storage capacity.

Referring still to FIG. 3, the fuel system 200 further includes a fuel delivery assembly 210. The fuel delivery assembly 210 generally includes a liquid hydrogen delivery assembly 212 in fluid communication with the liquid hydrogen fuel tanks 206, a gaseous hydrogen delivery assembly 214 in fluid communication with the gaseous hydrogen fuel tank 208, and a regulator assembly 216 in fluid communication with both the liquid hydrogen delivery assembly 212 and the gaseous hydrogen delivery assembly 214 for providing hydrogen fuel to the engine 202.

The liquid hydrogen delivery assembly 212 generally includes a pump 218 and a heat exchanger 220 located downstream of the pump 218. The pump 218 is configured to provide a flow of the first portion of hydrogen fuel in the liquid phase from the liquid hydrogen fuel tanks 206 through the liquid hydrogen delivery assembly 212. Operation of the pump 218 may be or decreased to effectuate a change in a volume of the first portion of hydrogen fuel through the liquid hydrogen delivery assembly 212, and to the regulator assembly 216 and engine 202. The pump 218 may be any suitable pump configured to provide a flow of liquid hydrogen fuel. For example, in certain exemplary aspects, the pump 218 may be configured as a cryogenic pump.

More specifically, in the exemplary aspect depicted, the pump 218 is the primary pump for the liquid hydrogen delivery assembly 212, such that substantially all of a motive force available for providing a flow of liquid hydrogen through the liquid hydrogen delivery assembly 212 (excluding an internal pressurization of the liquid hydrogen fuel tank 206) is provided by the pump 218. For example, at least about 75% of the motive force available for providing a flow of liquid hydrogen through the liquid hydrogen delivery assembly 212 may be provided by the pump 218, such as at least about 80%, such as at least about 85%, such as at least about 90%, such as at least about 95%, such as about 100%.

It will be appreciated that in at least certain exemplary aspects, particularly given the difficulty of pumping a fluid at the relatively low temperatures required to maintain hydrogen in the liquid phase, the pump 218 may not be capable of operating across a wide operating range. For example, the pump 218 may generally define a maximum pump capacity and a minimum pump capacity (each in kilograms per second). A ratio of the maximum pump capacity to the minimum pump capacity may be referred to as a turndown ratio of the pump 218. In at least certain exemplary aspects, the pump 218 may define a turndown ratio of at least 1:1 and up to about 6:1. For example, in certain exemplary aspects, the pump 218 may define a turndown ratio of at least about 2:1, such as at least about 3:1, and up to about 5:1. The effect of such a configuration on the fuel system 200 will be described in greater detail below.

The heat exchanger 220, as noted, is located downstream of the pump 218 and is configured to convert the second portion of hydrogen fuel through the liquid hydrogen delivery assembly 212 from the liquid phase to a gaseous phase. With at least certain exemplary aspects, the heat exchanger 220 may be in thermal communication with the engine 202, and more specifically, with an accessory system of the engine 202 to provide the heat necessary to increase a temperature of the second portion of the hydrogen fuel through the liquid hydrogen delivery assembly 212 to change the second portion of the hydrogen fuel from the liquid phase to the gaseous phase.

Figure 4:
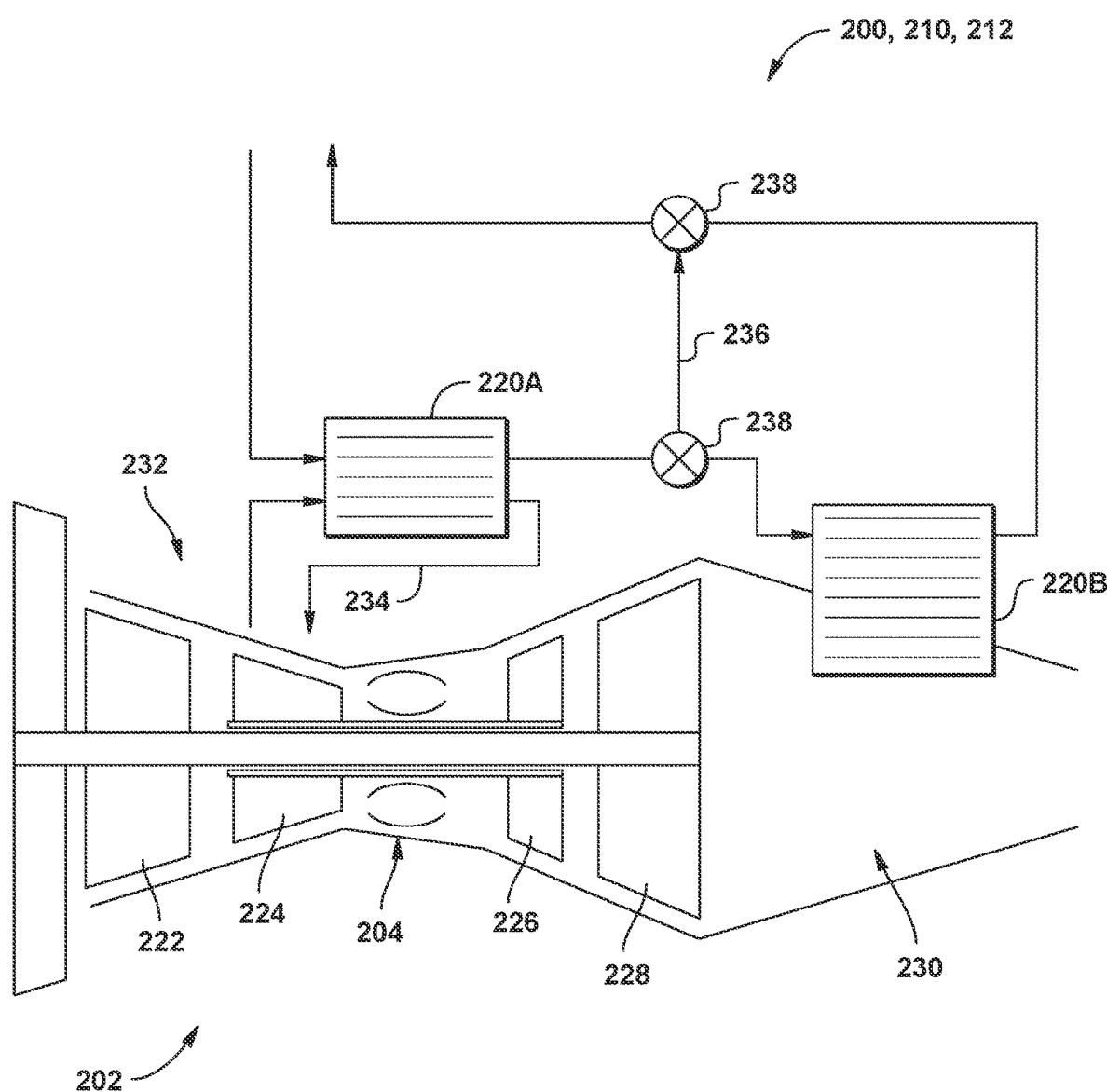
FIG. 4 is a schematic view of a heat exchanger assembly in accordance with an exemplary aspect of the present disclosure.

For example, referring now to FIG. 4, a schematic view of an engine 202 in accordance with an exemplary aspect of the present disclosure is provided. The exemplary engine 202 of FIG. 4 may be configured in a similar manner as exemplary turbofan engine 100 of FIG. 2. For example, the exemplary engine 202 generally includes a compressor section having an LP compressor 222 and an HP compressor 224, a combustion section including the combustor 204, a turbine section including an HP turbine 226 and an LP turbine 228, and an exhaust section 230. As with the exemplary turbofan engine 100 of FIG. 2, the exemplary engine 202 of FIG. 4 may include one or more accessory systems.

More specifically, for the exemplary engine 202 of FIG. 4, the engine 202 includes a first accessory system 232, which may be, e.g., a lubrication oil system. The lubrication oil system generally includes a recirculation assembly 234 for receiving relatively hot lubrication oil from within the engine 202, cooling the relatively hot lubrication oil, and providing the relatively cool lubrication oil back to the engine 202.

For the embodiment depicted, the heat exchanger 220 of the liquid hydrogen delivery assembly 212 more particularly includes a first fuel system heat exchanger 220A, with the first fuel system heat exchanger 220A configured in thermal communication with the first accessory system 232 recirculation assembly 234 of the lubrication oil system. In such a manner, heat from the flow of lubrication oil through the recirculation assembly 234 of the lubrication oil system may be transferred to a flow of the first portion of hydrogen fuel through the liquid hydrogen delivery assembly 212.

It will be appreciated, however, that during certain operations, the additional heat may be needed. For example, during high fuel flowrate operations, additional heat may be needed to properly vaporize the first portion of hydrogen fuel through the liquid hydrogen delivery assembly 212. Additionally, or alternatively, during initial engine operations, when the lubrication oil may not contain a high amount of heat, additional heat may be needed to properly vaporize the first portion of hydrogen fuel through the liquid hydrogen delivery assembly 212.

Accordingly, for the embodiment depicted, the heat exchanger 220 of the liquid hydrogen delivery assembly 212 additionally includes a second accessory system heat exchanger 220B. The second accessory system heat exchanger 220B is positioned in thermal communication with the exhaust section 230 of the engine 202 for receiving waste heat from an exhaust gas flowing through the exhaust section 230 of the engine 202 during operation of the engine 202.

In such a manner, it will be appreciated that the heat exchanger 220 of the liquid hydrogen delivery assembly 212, and more specifically, the first accessory system heat exchanger 220A and the second accessory system heat exchanger 220B, are in thermal communication with both the lubrication oil system and the exhaust section 230 of the engine 202 during at least certain operations.

However, as will be appreciated, for the exemplary embodiment depicted in FIG. 4, the liquid hydrogen delivery assembly 212 further includes a bypass line 236 and one or more bypass valves 238. In such a manner, the liquid hydrogen delivery assembly 212 may be capable of bypassing, e.g., the second accessory system heat exchanger 220B when heat from the second accessory system heat exchanger 220B is not needed to properly vaporize the first portion of hydrogen fuel through the liquid hydrogen delivery assembly 212.

It will be appreciated, however that although for the embodiment depicted, the heat exchanger 220 of the liquid hydrogen delivery assembly 212 is positioned proximate the engine 202 (and potentially integrated at least partially into the exemplary engine 202), in other embodiments, the heat exchanger 220 of the liquid hydrogen delivery assembly 212 may be located remotely from the exemplary engine 202, and an intermediate thermal transport bus may transport heat from the engine 202 to the heat exchanger 220 of the liquid hydrogen delivery assembly 212 using, e.g., an intermediate heat transfer fluid.

Referring back particularly to FIG. 3, it will be appreciated that the liquid hydrogen fuel tank 206 may define a fixed volume, such that as the liquid hydrogen fuel tank 206 provides hydrogen fuel to the fuel system 200 substantially completely in the liquid phase, a volume of the liquid hydrogen fuel in the liquid hydrogen fuel tank 206 decreases, and the volume is made up by, e.g., gaseous hydrogen fuel. Further, during the normal course of storing the first portion of hydrogen fuel in the liquid phase, an amount of the first portion of hydrogen fuel may vaporize.

In order to prevent an internal pressure within the liquid hydrogen fuel tank 206 from exceeding a desired pressure threshold, the exemplary fuel system 200 of FIG. 3 allows for a purging of gaseous hydrogen fuel from the liquid hydrogen fuel tank 206. More specifically, for the exemplary embodiment of FIG. 3, the exemplary fuel delivery assembly 210 of the fuel system 200 includes a boil-off fuel assembly 240 configured to receive gaseous hydrogen fuel from the liquid hydrogen fuel tank 206. The exemplary boil-off fuel assembly 240 generally includes a boil-off compressor 242 and a boil-off tank 244. The boil-off tank 244 is in fluid communication with the liquid hydrogen fuel tanks 206 and is further in fluid communication with the gaseous hydrogen delivery assembly 214. During operation, gaseous fuel from the liquid hydrogen fuel tanks 206 may be received in the boil-off fuel assembly 240, may be compressed by the boil-off compressor 242 and provided to the boil-off tank 244. The boil-off tank 244 may be configured to store the gaseous hydrogen fuel at a lower pressure than the pressure of the second portion of the hydrogen fuel within the gaseous hydrogen fuel tank 208. For example, the boil-off tank 244 may be configured to maintain gaseous hydrogen fuel therein at a pressure of between about 100 bar and about 400 bar, such as between 130 bar and about 300 bar. The pressurization of the gaseous hydrogen fuel in the boil-off tank 244 may be provided substantially completely by the boil-off compressor 242. Maintaining the gaseous hydrogen fuel in the boil-off tank 244 at the lower pressure may allow for the boil-off compressor 242 to be relatively small.

Referring again to the gaseous hydrogen delivery assembly 214, the gaseous hydrogen delivery assembly 214 generally includes a three-way boil-off valve 246 defining a first input 248, a second input 250, and an output 252. The first input 248 may be in fluid communication with the gaseous hydrogen fuel tank 208 for receiving a flow of the second portion of hydrogen fuel in the gaseous phase from the gaseous hydrogen fuel tank 208. For the embodiment depicted, the second input 250 is in fluid communication with the boil-off fuel assembly 240 for receiving a flow of gaseous hydrogen fuel from, e.g., the boil-off tank 244 of the boil-off fuel assembly 240. The three-way boil-off valve 246 may be configured to combine and/or alternate the flows from the first input 248 and the second input 250 to a single flow of gaseous hydrogen through the output 252. For the embodiment shown, the three-way boil-off valve 246 is an active valve, such that an amount of gaseous hydrogen fuel provided from the first input 248, as compared to the amount of gaseous hydrogen fuel provided from the second input 250, to the output 252 may be actively controlled.

In other exemplary embodiments, the three-way boil-off valve 246 may be a passive valve.

For the embodiment shown, the regulator assembly 216 further includes a gaseous hydrogen delivery assembly flow regulator ("GHDA flow regulator 254"). The GHDA flow regulator 254 may be configured as an actively controlled variable throughput valve configured to provide a variable throughput ranging from 0% (e.g., a completely closed off position) to 100% (e.g., a completely open position), as well as a number of intermediate throughput values therebetween. More specifically, for the embodiment shown, the GHDA flow regulator 254 includes a valve portion 256 and an actuator 258. The actuator 258 is mechanically coupled to the valve portion 256 to provide the variable throughput therethrough.

As briefly mentioned, the regulator assembly 216 is in fluid communication with both the liquid hydrogen delivery assembly 212 and the gaseous hydrogen delivery assembly 214 for providing gaseous hydrogen fuel to the engine 202, and more specifically, to the combustor 204 of the engine 202.

Particularly for the embodiment depicted, the regulator assembly 216 includes a three-way regulator valve 260. The three-way regulator valve 260 defines a first input 262, a second input 264, and an output 266. The first input 262 may be in fluid communication with the gaseous hydrogen delivery assembly 214 for receiving a flow of the second portion of hydrogen fuel in the gaseous phase from the gaseous hydrogen fuel tank 208 (and, e.g., the boil-off fuel assembly 240). The second input 264 is in fluid communication with the liquid hydrogen delivery assembly 212 for receiving a flow of the first portion of the hydrogen fuel in the gaseous phase from the liquid hydrogen fuel tank 206 (vaporized using, e.g., the heat exchanger 220). The three-way boil-off valve 246 may be configured to combine and/or alternate the flows from the first input 262 and the second input 264 to a single flow of gaseous hydrogen through the output 266. For the embodiment shown, the three-way boil-off valve 246 is an active three-way boil-off valve 246, including an actuator 268, such that an amount of gaseous hydrogen fuel provided from the first input 262, as compared to the amount of gaseous hydrogen fuel provided from the second input 264, to the output 266 may be actively controlled.

In other exemplary embodiments, the three-way boil-off valve 246 may be a passive valve.

For the embodiment shown, the regulator assembly 216 further includes a regulator assembly flow regulator ("RA flow regulator 270"). The RA flow regulator 270 may be configured as an actively controlled variable throughput valve configured to provide a variable throughput ranging from 0% (e.g., a completely closed off position) to 100% (e.g., a completely open position), as well as a number of intermediate throughput values therebetween. More specifically, for the embodiment shown, the RA flow regulator 270 includes a valve portion 274 and an actuator 276. The actuator 276 is mechanically coupled to the valve portion 274 to provide the variable throughput therethrough.

Figure 5:
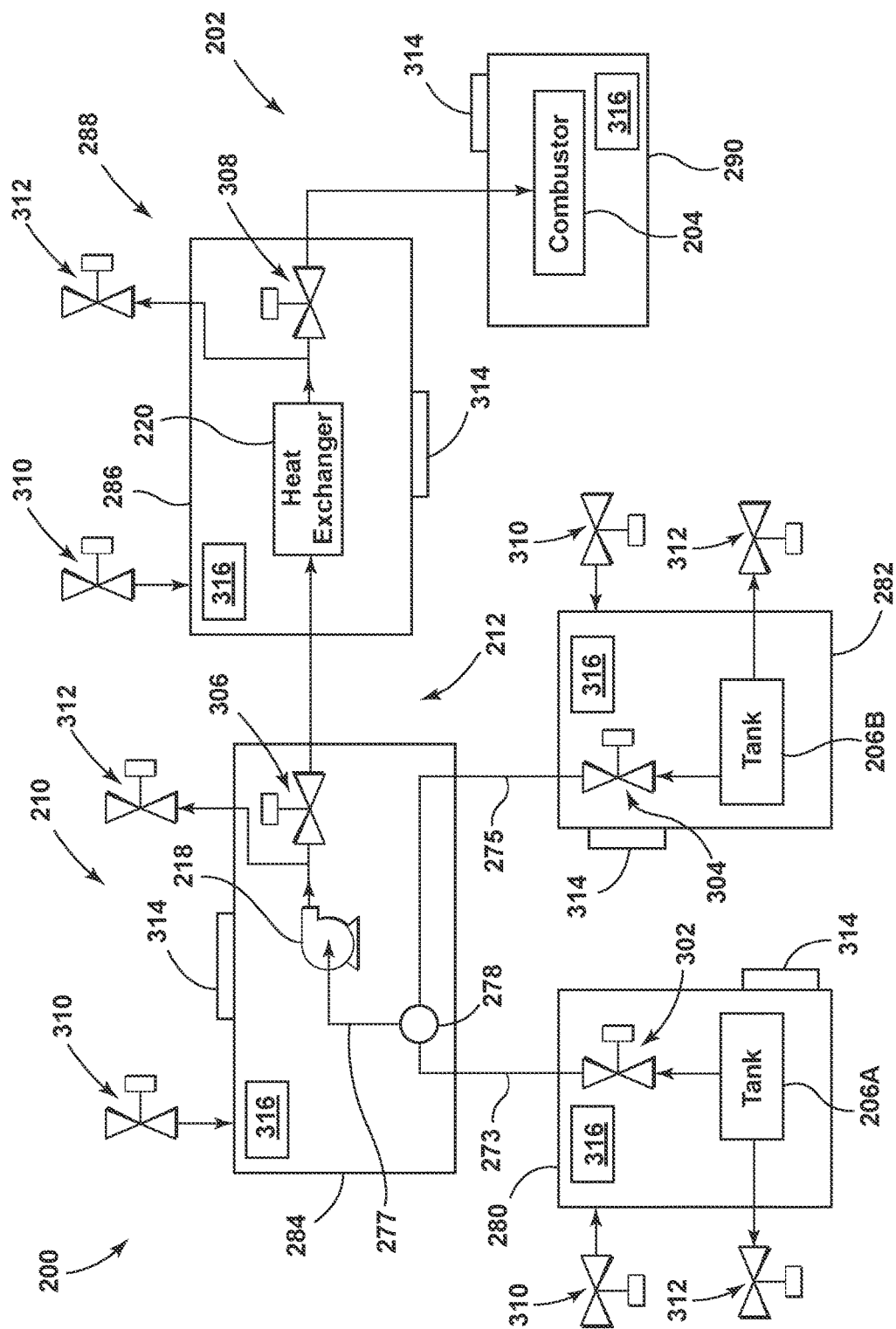
FIG. 5 is a simplified, schematic view of the fuel system shown in FIG. 3.

FIG. 5 illustrates a simplified, schematic view of the hydrogen fuel system 200, particularly illustrating certain components of the fuel system 200. Specifically, FIG. 5 illustrates the liquid hydrogen fuel tanks 206 (e.g., a first liquid hydrogen fuel tank 206A and a second liquid hydrogen fuel tank 206B), the pump 218, the heat exchanger 220, and the combustor 204.

As mentioned above, such components 206A, 206B, 218, 220, 204 are fluidly coupled together. Specifically, as shown, a first branch fluid conduit 273 is fluidly coupled to the first liquid hydrogen fuel tank 206A. Similarly, as shown, a second branch fluid conduit 275 is fluidly coupled to the second liquid hydrogen fuel tank 206B. The first and second branch fluid conduits 273, 275 are joined to a main fluid conduit 277 via a junction 278. The main fluid conduit 277 from the junction 278 through the pump 218 and the heat exchanger 220 to the combustor 204. Thus, the first branch fluid conduit 273 and the main fluid conduit 277 allow hydrogen to be delivered from the first liquid hydrogen tank 206A to the combustor 204. Similarly, the second branch fluid conduit 275 and the main fluid conduit 277 allow hydrogen to be delivered from the second liquid hydrogen tank 206B to the combustor 204. However, in alternative embodiments, the components 206A, 206B, 218, 220, 204 are fluidly coupled together in any other suitable manner.

Furthermore, the components 206A, 206B, 218, 220, 204 are placed in corresponding compartments. In general, the compartments enclose or otherwise surround the corresponding component to allow this component to be selectively isolated from the other compartments and the reminder of the aircraft 10 and/or turbofan engine 100. Thus, such a leak associated with one of the components 206A, 206B, 218, 220, 204, the corresponding compartment can be closed to contain the leak. For example, as shown, the first liquid hydrogen tank 206A is positioned within a first compartment 280, the second liquid hydrogen tank 206B is positioned within a second compartment 282, the pump 218 is positioned within a third compartment 284, the heat exchanger 220 is positioned within a fourth compartment 286 located within a nacelle 288 of the engine 202, and the combustor 204 is positioned within a fifth compartment 290 within the core of the engine 202. However, in alternative embodiments, other components of the fuel system 200 may be positioned in other compartments. Moreover, in certain instances, multiple components may be placed in the same compartment.

Additionally, the hydrogen fuel system 200 includes control valves. In general, a control valve is positioned within each of the compartments 280, 282, 284, 286. As such, each control valve allows the flow of hydrogen through the component(s) within the corresponding compartment 280, 282, 284, 286 to be selectively turned on and off. For example, in the illustrated embodiment, a first control valve 302 may be positioned within the first compartment 280 and fluidly coupled to the first branch fluid conduit 273. Thus, the first control valve 302 allows the flow of hydrogen from the first liquid hydrogen tank 206A to be turned on and off. A second control valve 304 may be positioned within the second compartment 282 and fluidly coupled to the second branch fluid conduit 275. Thus, the second control valve 304 allows the flow of hydrogen from the second liquid hydrogen tank 206B to be turned on and off. A third control valve 306 may be positioned within the third compartment 284 and fluidly coupled to the main fluid conduit 277. Thus, the third control valve 306 allows the flow of hydrogen from the pump 218 to be turned on and off. A fourth control valve 308 may be positioned within the fourth compartment 286 and fluidly coupled to the main fluid conduit 277. Thus, the fourth control valve 308 allows the flow of hydrogen from the heat exchanger 220 to be turned on and off. Other compartments may include control valves. Additionally, there may be multiple control valves in each compartment.

In several embodiments, the compartments 280, 282, 284, 286 include a corresponding ventilation device 310. In general, each ventilation device 310 is configured to allow air flow into the corresponding compartment, such as to dilute a hydrogen leak that is present within that compartment. For example, when a hydrogen leak is detected within the first compartment 280 (e.g., there is a leak associated with the first liquid hydrogen tank 206A), the corresponding ventilation device 310 may be opened to provide air flow to the first compartment 280, thereby diluting the hydrogen concentration within the first compartment 280.

Figure 6:
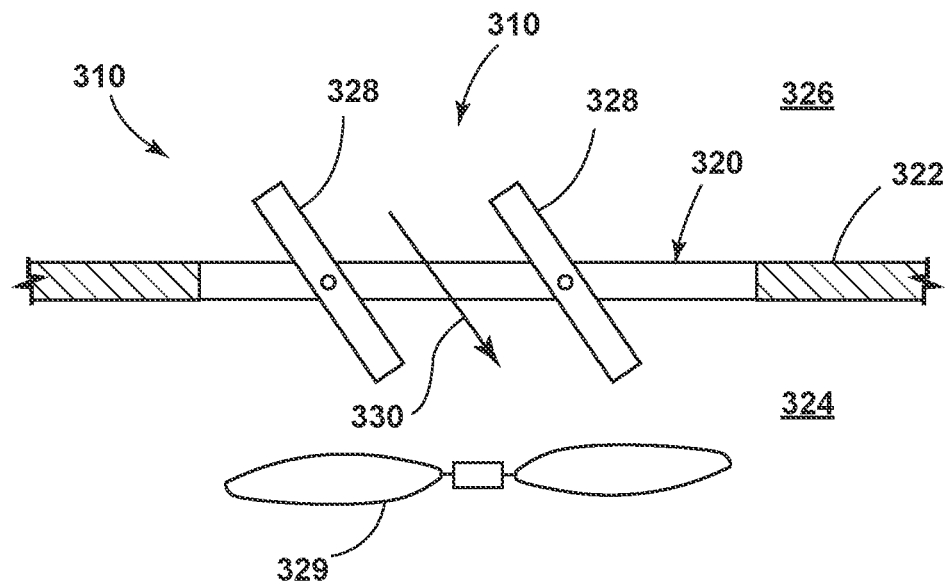
FIG. 6 is a cross-sectional view of a ventilation device for a fuel system in accordance with an exemplary aspect of the present disclosure.

FIG. 6 illustrates an exemplary embodiment of a ventilation device 310. Specifically, as shown, a wall 322 forming part of the compartment defines an opening 320 therein. The opening 320, in turn, allows for fluid communication between an interior 324 of the compartment and an exterior 326 of the compartment. In this respect, the ventilation device 310 includes one or more louvers 328 positioned within the opening 320 and rotatably coupled to the wall 322. Thus, the louvers 328 can be moved between a fully closed position and fully opened position. In some embodiments, the louvers 328 may be in either the fully closed position or the fully opened position. In other embodiments, the louvers 328 may be positionable at various positions between the fully closed position and the fully opened position. In one embodiment, a fan 329 may be positioned adjacent to the opening 320 to draw air 330 into the interior 324 to dilute the hydrogen content present within the interior 324. However, in alternative embodiments, the ventilation devices 310 may have any other suitable configuration that allows from air to be drawn into the compartments.

Referring again to FIG. 5, compartments 280, 282, 284, 286 may include a corresponding vent valve 312. In general, each vent valve 312 is configured to discharge hydrogen from the component(s) within the corresponding compartment, thereby reducing the pressure within such component(s). Reducing the pressure within the component(s), in turn, reduces the magnitude of the leak. For example, in the illustrated embodiment, the vent valves 312 associated with the first and second compartments 280, 282 are in fluid communication with the first and second liquid hydrogen tanks 206A, 206B, respectively. Thus, when a leak is present within the first or second compartment 280, 282, the corresponding vent valve 312 may discharge hydrogen from the leaking first and/or second liquid hydrogen tanks tank 206A, 206B to outside of the aircraft 10 and/or turbofan engine 100 to reduce the pressure within the leaking tank first and/or second liquid hydrogen tanks 206A, 206B. Similarly, the vent valves 312 associated with the second and third compartments 284, 286 are in fluid communication with main fluid conduit 277 at locations within the respective compartment.

The vent valves 312 may have any suitable configurations, such as solenoid valves.

Moreover, in several embodiments, each of the compartments 280, 282, 284, 286, 290 include quick release panels 314. In general, the quick release panels 314 are portions of the corresponding compartment that are frangible and can be opened rapidly (i.e., more rapidly than the ventilation devices 310) to provide air from the exterior of the compartment (e.g., from the exterior of the aircraft 10 or the turbofan engine 100) to the corresponding compartment in the event of a severe or fast hydrogen. Thus, in instances where the hydrogen level in a compartment is rising too quickly for the ventilation devices 310 or vent valve 312 to have an effect, the corresponding quick release panel 314 can be opened to rapidly provide a large volume to dilute the hydrogen concentration within the compartment.

Figure 7:
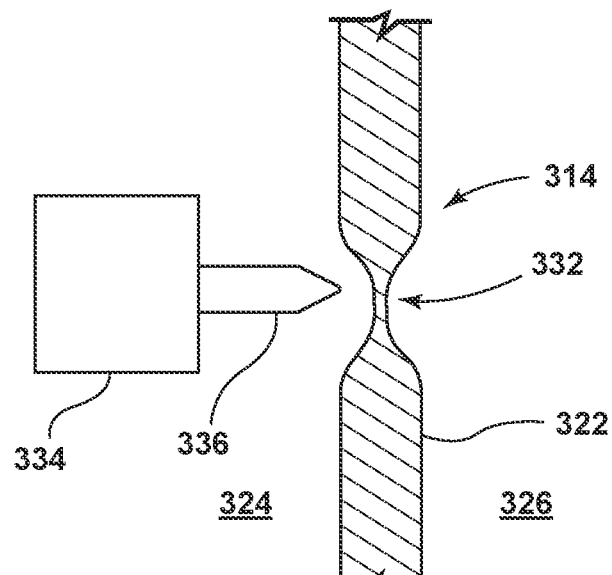
FIG. 7 is a cross-sectional view of a quick release panel and associated actuator for a fuel system in accordance with an exemplary aspect of the present disclosure.

FIG. 7 illustrates one embodiment of a quick release panel 314. Specifically, as shown, the compartment wall 322 separating the compartment interior 324 from the compartment exterior 326 may include a frangible portion 332 corresponding to the quick release panel 314. In the illustrated embodiment, the frangible portion 332 may be a thinned region of the compartment 322 that can be punctured or severed quickly to allow a large volume of air from the compartment exterior 326 to flow into the compartment interior 324. In this respect, a quick release panel actuator 334 may be positioned adjacent to the quick release panel. The quick release panel actuator 334 may, in turn, be configured to drive a stake 336 through the frangible portion 332, thereby opening the compartment wall 322. As such, the quick release panel actuator 334 may correspond to a hydraulic actuator, a pneumatic actuator, an electric actuator, an explosively powered actuator, and/or the like. However, in alternative embodiments, the frangible portion 332 of the quick release panel 314 may open when the pressure within the compartment interior 324 exceeds a threshold value. That is, in such embodiments, quick release panel 312 may be opened passively due to overpressure within the compartment interior 325 and without the need for the quick release actuator 334.

Figure 8:
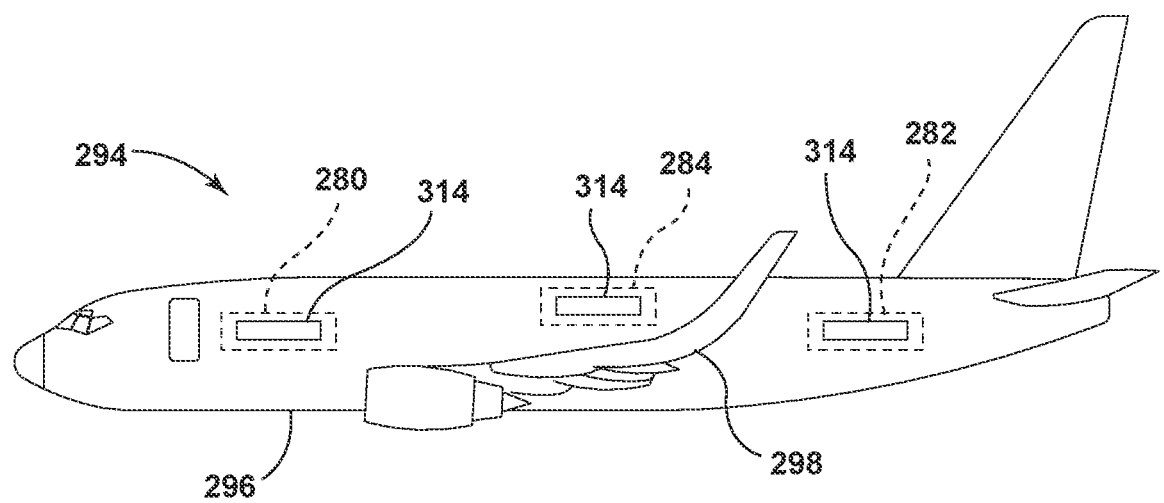
FIG. 8 is a side view of an aircraft in accordance with an exemplary aspect of the present disclosure, particularly illustrating example locations of quick release panels.

Referring to FIG. 8, example locations for the compartments and associated quick release panels 314 on an exemplary aircraft 294 (which may correspond to the aircraft 10) are illustrated. For example, as shown, the first, second, and third compartments 280, 282, 284 and the associated quick release panels 314 are located on and/or within a fuselage 296 of the aircraft 294. However, in alternative embodiments, the first, second, and third compartments 280, 282, 284 and the associated quick release panels 314 may be located on and/or within a wing(s) 298 and/or an engine of the aircraft 294.

Figure 9:
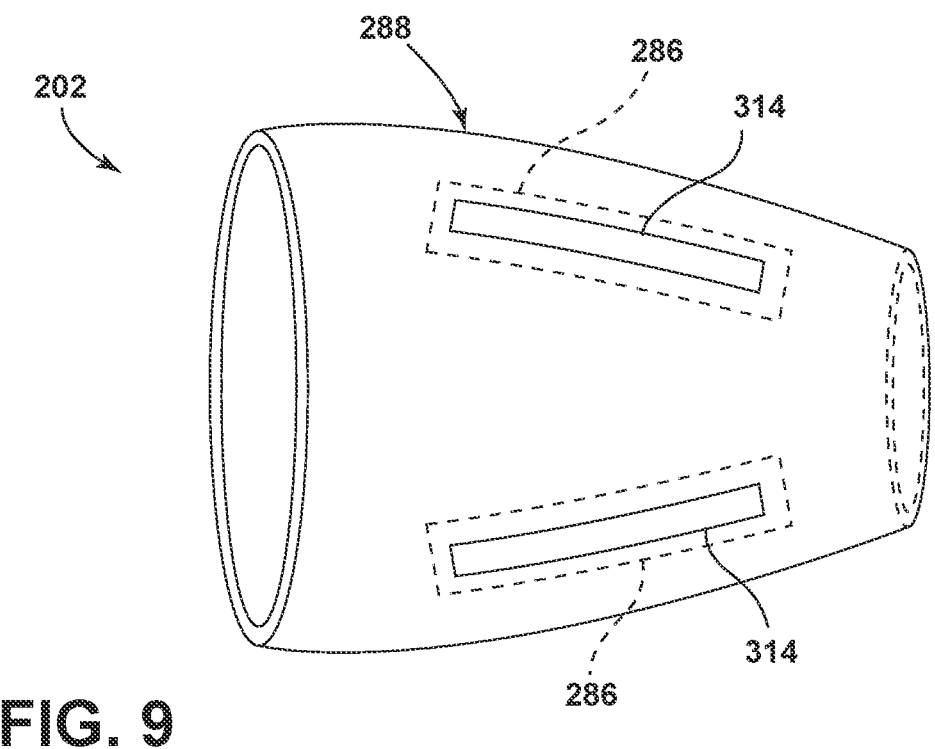
FIG. 9 is a side view of a gas turbine engine in accordance with an exemplary aspect of the present disclosure, particularly illustrating example locations of quick release panels.

Referring to FIG. 9, additional example locations for the compartments and associated quick release panels 314 on the nacelle 288 are illustrated. For example, as shown, the fourth compartments 286 and the associated quick release panel 314 is located on and/or within nacelle 288. However, in alternative embodiments, the fourth compartments 286 and the associated quick release panel 314 may be located on and/or within the fuselage 296 and/or the wings 298 of the aircraft 294.

Figure 10:
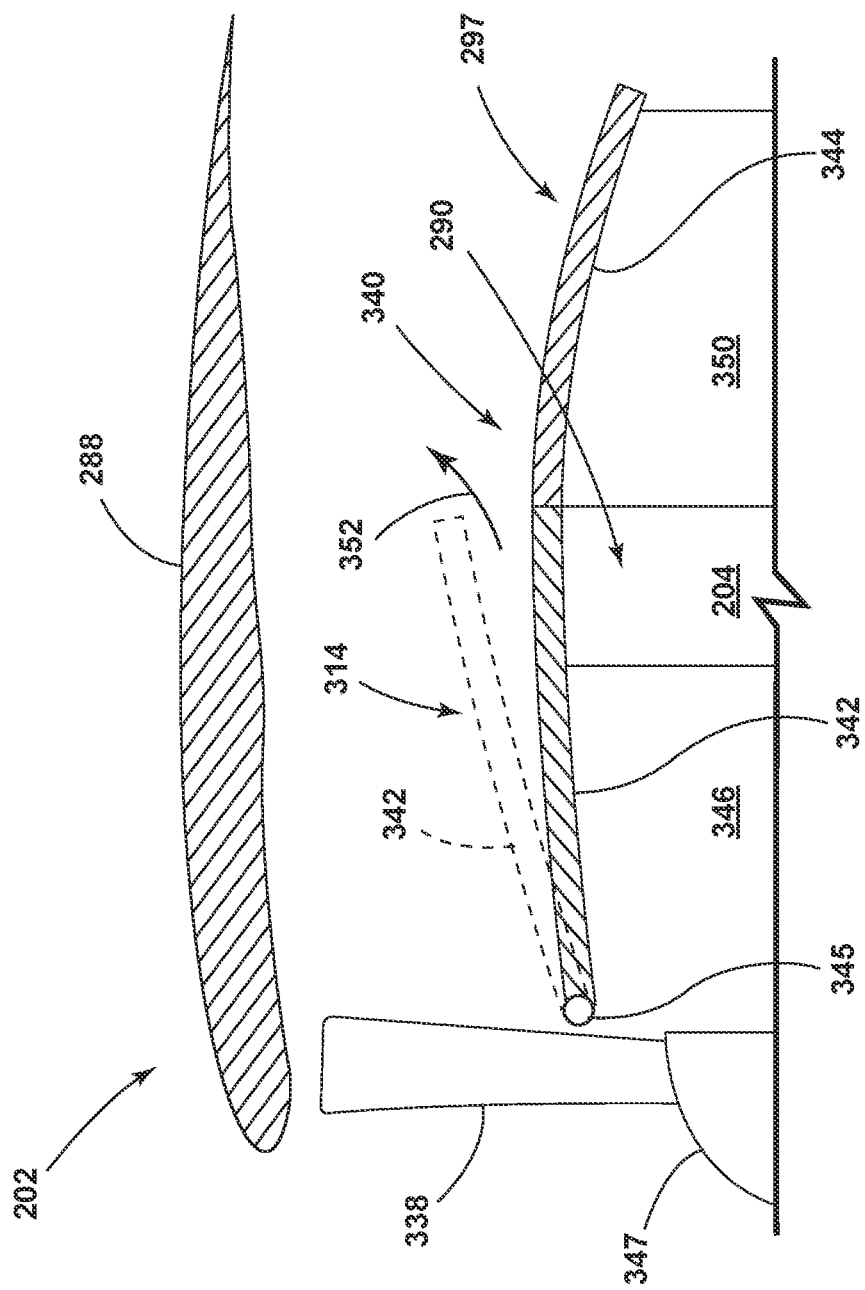
FIG. 10 is a simplified, cross-sectional view of a gas turbine engine in accordance with an exemplary aspect of the present disclosure, particularly illustrating one embodiment of a quick release panel positioned within the engine.

FIG. 10 illustrates an embodiment of a quick release panel 314 associated with the fifth compartment 290, which may be positioned within a core engine 340 of the engine 202. As shown, the core engine 340 includes a compressor 346, the combustor 204, and a turbine 350 positioned within a core casing 297. Additionally, the engine 202 includes a fan 338 and an associated fan rotor hub 347. In this respect, the quick release panel 314 may be integrated into the core casings 297. More specifically, the core casing 297 may include first casing portion 342 encasing the compressor 346 and the combustor 204 and a second casing portion 344 encasing the turbine 350. The first casing portion 342, in turn, is pivotable relative to the second casing portion 344 about a pivot joint 345. Thus, when the first casing portion 342 pivots relative to the second casing portion 344 (as shown in dashed lines in FIG. 10), the fifth compartment 290 is opened, thereby allowing hydrogen 352 to exit the compartment. Alternatively, the second casing portion 344 may be pivotable relative to the first casing portion 342 about a pivot joint.

In alternative embodiments, the quick release panels 314 may have any other suitable configuration that allow for functioning as described herein.

Referring again to FIG. 5, the hydrogen fuel system 200 includes a plurality of hydrogen sensors 316. In general, each hydrogen sensor 316 is positioned within one of the compartments 280, 282, 284, 286, 290 and is configured to generate data indicative of the level of hydrogen present within the corresponding compartment. As such, the hydrogen sensors 316 may be configured as any suitable types of sensing devices for detecting hydrogen, such an optical fiber surface plasmon resonance (SPR) sensors, electrochemical hydrogen sensors, MEMS hydrogen sensors, thin film sensors, thick film sensors, and/or the like.

Figure 11:
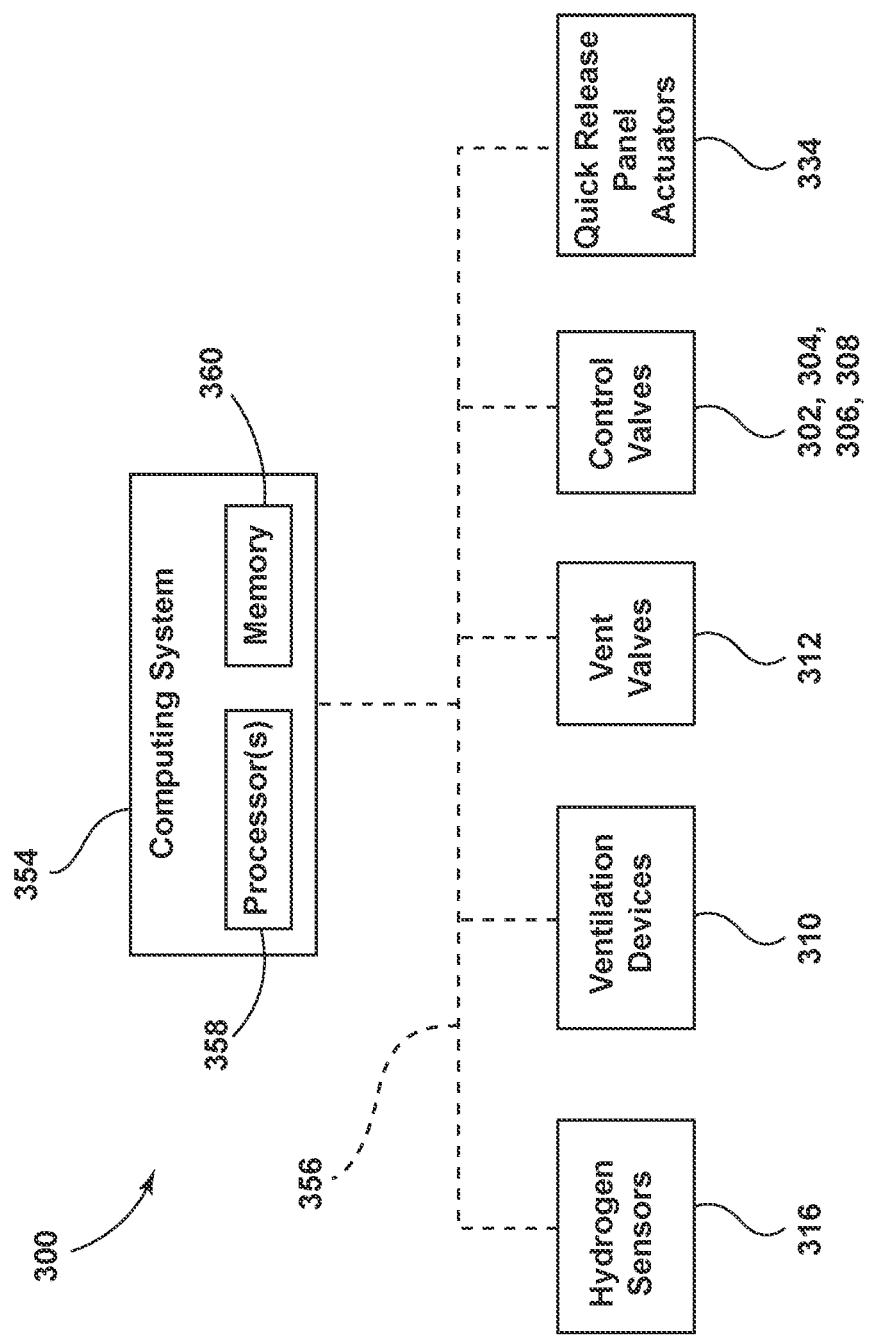
FIG. 11 is a schematic view of a system for detecting hydrogen leaks within a vehicle in accordance with an exemplary aspect of the present disclosure.

Referring now to FIG. 11, a schematic view of one embodiment of a system 300 for detecting hydrogen leaks within a vehicle is illustrated in accordance with aspects of the present subject matter. In general, the system 300 will be described herein with reference to the aircraft 10, the turbofan engine 100, and the hydrogen fuel system 200 described above with reference to FIGS. 1-10. However, it should be appreciated by those of ordinary skill in the art that the disclosed system 300 may generally be utilized with vehicles having any other suitable vehicle configuration, gas turbine engines having any other suitable engine configuration, and/or hydrogen fuel systems having any other suitable configuration.

As shown in FIG. 11, the system 300 may include certain components of the hydrogen fuel system 200. For example, in the illustrated embodiment, the system 300 includes the control valves 302, 304, 306, 308; the ventilation devices 310; the vent valves 312; the hydrogen sensors 316; and the blow panel actuators 334.

Moreover, the system 300 includes a computing system 354 communicatively coupled to one or more components of the aircraft 10, the turbofan engine 100, the hydrogen fuel system 200, and/or the system 300 to allow the operation of such components to be electronically or automatically controlled by the computing system 354. For instance, the computing system 354 may be communicatively coupled to the hydrogen sensors 316 via a communicative link 356. As such, the computing system 354 may be configured to receive data from the hydrogen sensors 316 that is indicative of the level of hydrogen present within the compartments 280, 282, 284, 286, 290. Furthermore, the computing system 354 may be communicatively coupled to the control valves 302, 304, 306, 308; the ventilation devices 310; the vent valves 312; and the blow panel actuators 334 via the communicative link 356. In this respect, the computing system 354 may be configured to control the operation of the control valves 302, 304, 306, 308; the ventilation devices 310; the vent valves 312; and the blow panel actuators 334 to reduce the hydrogen concentration within the compartments 280, 282, 284, 286, 290. In addition, the computing system 354 may be communicatively coupled to any other suitable components of the aircraft 10, the turbofan engine 100, the hydrogen fuel system 200, and/or the system 300.

In general, the computing system 354 may comprise one or more processor-based devices, such as a given controller or computing device or any suitable combination of controllers or computing devices. Thus, in several embodiments, the computing system 354 may include one or more processor(s) 358 and associated memory device(s) 360 configured to perform a variety of computer-implemented functions. As used herein, the term "processor" refers not only to integrated circuits referred to in the art as being included in a computer, but also refers to a controller, a microcontroller, a microcomputer, a programmable logic circuit (PLC), an application specific integrated circuit, and other programmable circuits. Additionally, the memory device(s) 360 of the computing system 354 may generally comprise memory element(s) including, but not limited to, a computer readable medium (e.g., random access memory RAM)), a computer readable non-volatile medium (e.g., a flash memory), a floppy disk, a compact disk-read only memory (CD-ROM), a magneto-optical disk (MOD), a digital versatile disk (DVD) and/or other suitable memory elements. Such memory device(s) 360 may generally be configured to store suitable computer-readable instructions that, when implemented by the processor(s) 358 configure the computing system 354 to perform various computer-implemented functions, such as one or more aspects of the methods and algorithms that will be described herein. In addition, the computing system 354 may also include various other suitable components, such as a communications circuit or module, one or more input/output channels, a data/control bus and/or the like.

The various functions of the computing system 354 may be performed by a single processor-based device or may be distributed across any number of processor-based devices, in which instance such devices may be considered to form part of the computing system 354. For instance, the functions of the computing system 354 may be distributed across multiple application-specific controllers or computing devices, such as a hydrogen fuel system controller, a controller for the engine 202 (such as a full authority digital engine control, "FADEC," controller for the engine), a controller for the vehicle, etc.

Figure 12:
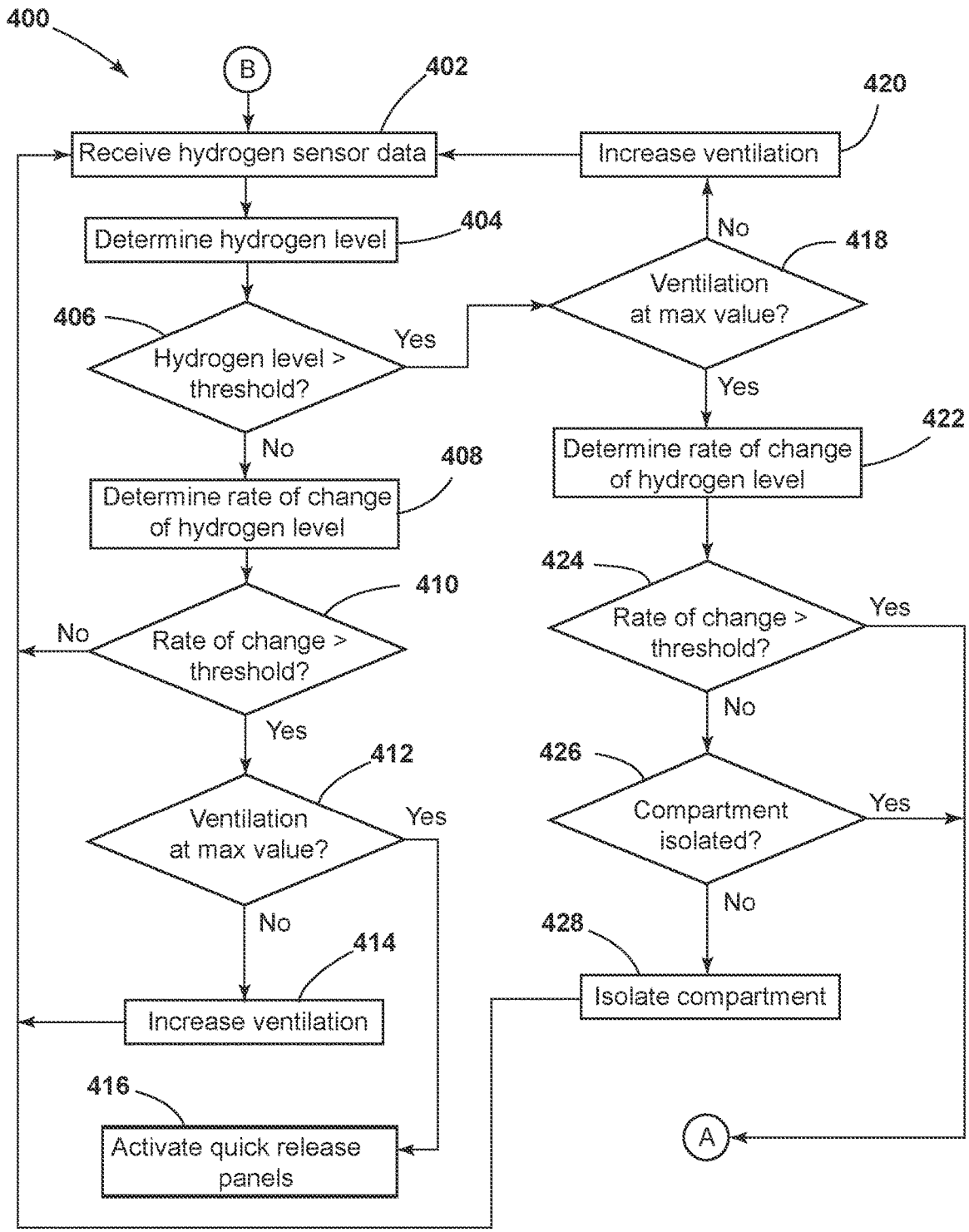
FIG. 12 is a partial, schematic view of control logic for detecting hydrogen leaks within a vehicle in accordance with an exemplary aspect of the present disclosure, particularly illustrating a first portion of the control logic.
Figure 13:
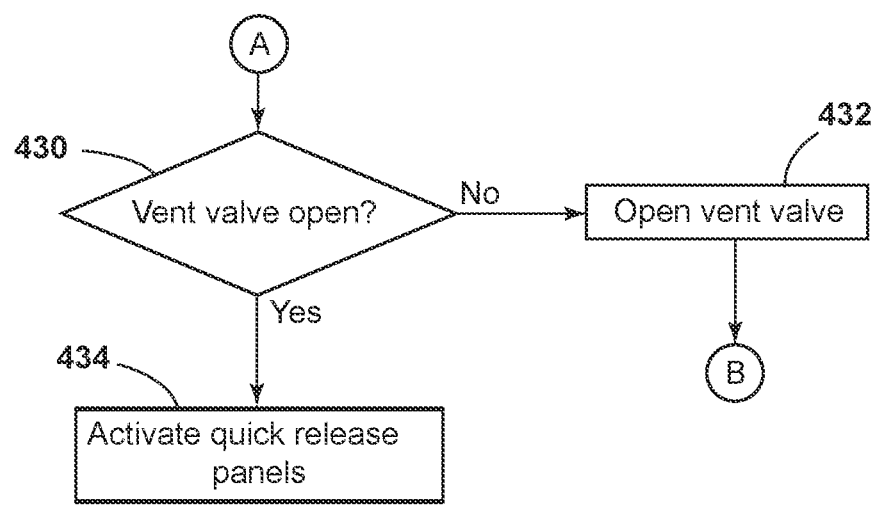
FIG. 13 is a partial, schematic view of control logic for detecting hydrogen leaks within a vehicle in accordance with an exemplary aspect of the present disclosure, particularly illustrating a second portion of the control logic.

Referring now to FIGS. 12 and 13, a flow diagram of one embodiment of example control logic 400 that may be executed by the computing system 354 (or any other suitable computing system) for detecting hydrogen leaks within a vehicle is illustrated in accordance with aspects of the present subject matter. Specifically, the control logic 400 shown in FIGS. 12 and 13 is representative of steps of one embodiment of an algorithm that can be executed to detect hydrogen leaks within a vehicle in a manner that allows for continued operation of the engine(s) of the vehicle when a leak occurs within the hydrogen fuel system by reducing the level of hydrogen within the compartment(s) of the vehicle and/or reducing the magnitude of the leak. Thus, in several embodiments, the control logic 400 may be advantageously utilized in association with a system installed on or forming part of a vehicle to allow for real-time detection of hydrogen leaks without requiring substantial computing resources and/or processing time. However, in other embodiments, the control logic 400 may be used in association with any other suitable system, application, and/or the like for detecting hydrogen leaks within a vehicle.

For purposes of clarity, the control logic 400 will be described below in the context of the first compartment 280 of the fuel system 200. It should be appreciated that the control logic 400 may simultaneously be implemented with each other compartment of the fuel system 200, such as the second, third, fourth, and fifth compartments 282, 284, 286, 290. Thus, in practice, the control logic 400 can be used to monitor for hydrogen leaks and initiate the appropriate control actions as necessary in all of the compartments of the fuel system 200 simultaneously.

As shown in FIG. 12, at (402), the control logic 400 includes receiving hydrogen sensor data indicative of the level of hydrogen present within a compartment of a vehicle. Specifically, as mentioned above, in several embodiments, the computing system 354 is communicatively coupled to the hydrogen sensors 316 via the communicative link 356. In this respect, during operation of the hydrogen fuel system 200, the computing system 354 receives data from the hydrogen sensor 316. Such data is, in turn, indicative of the level of hydrogen present within the first compartments 280.

Furthermore, at (404), the control logic 400 includes determining the level of hydrogen present within the compartment based on the received hydrogen sensor data. Specifically, in several embodiments, the computing system 354 is configured to analyze or otherwise process the hydrogen sensor data received (402) to determine the level of hydrogen present within the first compartment 280.

Additionally, at (406), the control logic 400 includes comparing the determined level of hydrogen present within the compartment to a threshold value. Specifically, in several embodiments, the computing system 354 is configured to compare the level of hydrogen present within the first compartment 280 determined at (404) to an associated threshold value. When the determined the level of hydrogen present within the first compartment 280 exceeds the associated threshold value (thereby indicating that the hydrogen level within the first compartment is too high), the control logic 400 proceeds to (418). Conversely, when the determined the level of hydrogen present within the first compartment 280 does not exceed the associated threshold value (thereby indicating that the hydrogen level within the first compartment is acceptable), the control logic 400 proceeds to (408).

Moreover, at (408), the control logic 400 includes determining the rate of change of the level of hydrogen present within the compartment based on the received hydrogen sensor data. Specifically, in several embodiments, the computing system 354 is configured to analyze or otherwise process the hydrogen sensor data received (402) to determine the rate of change of the level of hydrogen present within the first compartment 280.

In addition, at (410), the control logic 400 includes comparing the determined rate of change of the level of hydrogen present within the compartment to a threshold value. Specifically, in several embodiments, the computing system 354 is configured to compare the rate of change of the level of hydrogen present within the first compartment 280 determined at (408) to an associated threshold value. When the determined level of hydrogen present within the first compartment 280 exceeds the associated threshold value (thereby indicating that the hydrogen level within the first compartment is changing too quickly), the control logic 400 proceeds to (412). Conversely, when the determined rate of change of the level of hydrogen present within the first compartment 280 does not exceed the associated threshold value (thereby indicating that the rate at which the hydrogen level within the first compartment is changing is acceptable), the control logic 400 returns to (402).

As shown in FIG. 12, at (412), the control logic 400 includes determining whether the ventilation for the compartment is at the maximum ventilation value. Specifically, in several embodiments, the computing system 354 is configured to analyze the operation of the ventilation device 310 associated with the first compartment 280 to determine whether the ventilation device 310 is operating at its maximum level. When the ventilation device 310 associated with the first compartment 280 is not operating at its maximum level, the control logic 400 proceeds to (414). Conversely, when the ventilation device 310 associated with the first compartment 280 is at operating at its maximum level, the control logic 400 proceeds to (416).

Furthermore, at (414), the control logic 400 includes increasing the ventilation provided to the compartment. Specifically, in several embodiments, the computing system 354 is configured to control the operation of the ventilation device 310 associated with the first compartment 280 such that the ventilation device 310 provides the maximum ventilation to the first compartment 280. Upon completion of (414), the control logic 400 returns to (402).

Additionally, at (416) the control logic 400 includes activating the quick release panel associated with the compartment. Specifically, in several embodiments, the computing system 354 is configured to control the operation of the blow panel actuator 334 associated with the first compartment 280 such that the quick release panel 314 associated with the first compartment 280 is opened. Opening the quick release panel 314 rapidly provides a large quantity of air to the first compartment and allows the hydrogen to be discharged outside of the vehicle.

As mentioned above, when it is determined that the level of hydrogen present within the first compartment 280 exceeds the associated threshold value (thereby indicating that the hydrogen level within the first compartment is too high) at (406), the control logic 400 proceeds to (418). In this respect, at (418), the control logic 400 includes determining whether the ventilation for the compartment is at the maximum ventilation value. Specifically, in several embodiments, the computing system 354 is configured to analyze the operation of the ventilation device 310 associated with the first compartment 280 to determine whether the ventilation device 310 is operating at its maximum level. When the ventilation device 310 associated with the first compartment 280 is not operating at its maximum level, the control logic 400 proceeds to (420). Conversely, when the ventilation device 310 associated with the first compartment 280 is at operating at its maximum level, the control logic 400 proceeds to (422).

Moreover, at (420), the control logic 400 includes increasing the ventilation provided to the compartment. Specifically, in several embodiments, the computing system 354 is configured to control the operation of the ventilation device 310 associated with the first compartment 280 such that the ventilation device 310 provides the maximum ventilation to the first compartment 280. Upon completion of (420), the control logic 400 returns to (402).

Conversely, at (422), the control logic 400 includes determining the rate of change of the level of hydrogen present within the compartment based on the received hydrogen sensor data. Specifically, in several embodiments, the computing system 354 is configured to analyze or otherwise process the hydrogen sensor data received (402) to determine the rate of change of the level of hydrogen present within the first compartment 280.

In addition, at (424), the control logic 400 includes comparing the determined rate of change of the level of hydrogen present within the compartment to a threshold value. Specifically, in several embodiments, the computing system 354 is configured to compare the rate of change of the level of hydrogen present within the first compartment 280 determined at (422) to an associated threshold value. When the determined level of hydrogen present within the first compartment 280 exceeds the associated threshold value (thereby indicating that the hydrogen level within the first compartment is changing too quickly), the control logic 400 proceeds to (430). Conversely, when the determined rate of change of the level of hydrogen present within the first compartment 280 does not exceed the associated threshold value (thereby indicating that the rate at which the hydrogen level within the first compartment is changing is acceptable), the control logic 400 proceeds to (426).

Furthermore, at (426), the control logic 400 includes determining whether the compartment is isolated. Specifically, in several embodiments, the computing system 354 is configured to determine whether the first compartment 280 is isolated. When the first compartment 280 is isolated, the control logic 400 proceeds to (430). Conversely, when the first compartment 280 is not isolated, the control logic 400 proceeds to (428).

Additionally, at (428), the control logic 400 includes isolating the compartment. Specifically, in several embodiments, the computing system 354 is configured to control the operation of the first control valve 302 to shut of the flow of hydrogen from the first liquid hydrogen fuel tank 206A and isolate the first compartment 280. Moreover, the computing system 354 may control the operation of other components, such as the ventilation device 310, to isolate the first compartment 280. Thereafter, the computing system 354 controls the operation of the second control valve 304 to initiate the flow of hydrogen from the second liquid hydrogen fuel tank 206B, thereby maintain operation of the engine 202 when the first compartment is isolated. Upon completion of (428), the control logic 400 returns to (402).

As shown in FIG. 13, at (430), the control logic 400 includes determining whether the vent valve associated with the compartment is open. Specifically, in several embodiments, the computing system 354 is configured to analyze the operation of the vent valve 312 associated with the first compartment 280 to determine whether the vent valve 312 is open. When the vent valve 312 associated with the first compartment 280 is not open, the control logic 400 proceeds to (432). Conversely, when the vent valve 312 associated with the first compartment 280 is open, the control logic 400 proceeds to (434).

Moreover, at (432), the control logic 400 includes opening the vent valve associated with the compartment. Specifically, in several embodiments, the computing system 354 is configured to control the operation of the vent valve 312 associated with the first compartment 280 such that the vent valve 312 opened. Such opening of the vent valve 312 reduces the pressure of the hydrogen in the first liquid hydrogen fuel tank 206A, thereby reducing the magnitude of the leak within the first compartment 280. Upon completion of (432), the control logic 400 returns to (402).

In addition, at (434), the control logic 400 includes activating the quick release panel associated with the compartment. Specifically, in several embodiments, the computing system 354 is configured to control the operation of the blow panel actuator 334 associated with the first compartment 280 such that the quick release panel 314 associated with the first compartment 280 is opened. Opening the quick release panel 314 rapidly provides a large quantity of air to the first compartment and allows the hydrogen to be discharged outside of the vehicle.

Figure 14:
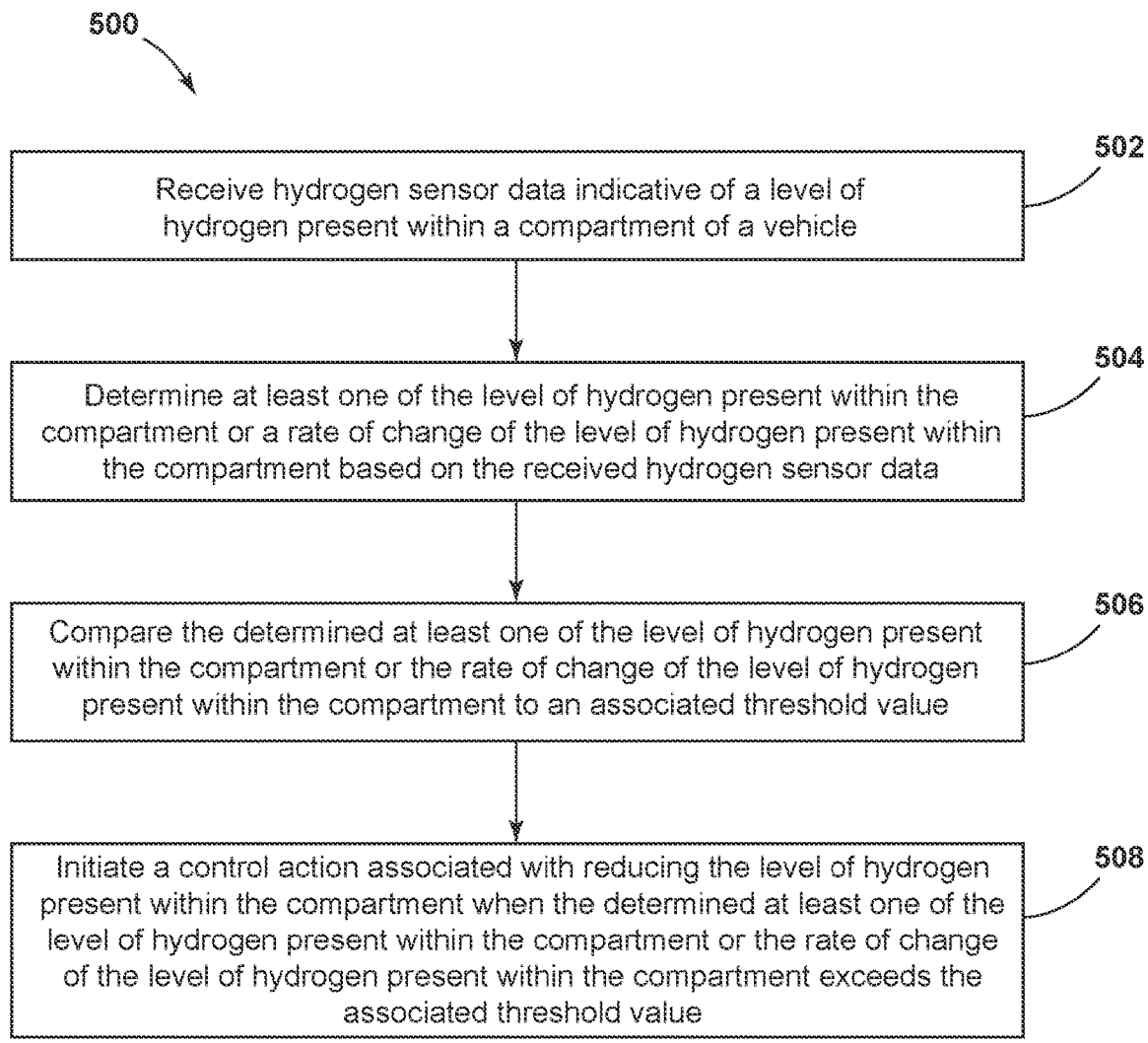
FIG. 14 is a flow diagram of a method for detecting hydrogen leaks within a vehicle in accordance with an exemplary aspect of the present disclosure.

Referring now to FIG. 14, a flow diagram of one embodiment of a method 500 for detecting hydrogen leaks within a vehicle is illustrated in accordance with an exemplary aspect of the present disclosure. In general, the method 500 will be described herein with reference to the aircraft 10, the turbofan engine 100, the hydrogen fuel system 200, and the system 300 described above with reference to FIGS. 1-12. However, it should be appreciated by those of ordinary skill in the art that the disclosed method 500 may generally be implemented with any vehicle having any suitable vehicle configuration, any gas turbine engine having any suitable engine configuration, any hydrogen fuel system having any suitable hydrogen fuel system configuration, and/or within any system having any suitable system configuration. In addition, although FIG. 13 depicts steps performed in a particular order for purposes of illustration and discussion, the methods discussed herein are not limited to any particular order or arrangement. One skilled in the art, using the disclosures provided herein, will appreciate that various steps of the methods disclosed herein can be omitted, rearranged, combined, and/or adapted in various ways without deviating from the scope of the present disclosure.

As shown in FIG. 14, at (502), the method 500 includes receiving, with a computing system, hydrogen sensor data indicative of a level of hydrogen present within the compartment. For example, as described above, the computing system 354 may receive hydrogen sensor data from the hydrogen sensors 316. The received data is, in turn, indicative of the level of hydrogen present within the compartments 280, 282, 284, 286, 290 in which components of the hydrogen fuel system 200 are present.

Furthermore, at (504), the method 500 includes determining, with the computing system, at least one of the level of hydrogen present within the compartment or a rate of change of the level of hydrogen present within the compartment based on the data generated by the hydrogen sensor. For example, as described above, the computing system 354 determines the level of hydrogen present within the compartments 280, 282, 284, 286, 290 and/or the rate of change of the level of hydrogen present within the compartments 280, 282, 284, 286, 290 based on the received hydrogen sensor data.

Additionally, at (506), the method 500 includes comparing, with the computing system, the determined at least one of the level of hydrogen present within the compartment or the rate of change of the level of hydrogen present within the compartment to an associated threshold value. For example, as described above, the computing system 354 compares the determined level of hydrogen present within the compartments 280, 282, 284, 286, 290 and/or the rate of change of the level of hydrogen present within the compartments 280, 282, 284, 286, 290 to an associated threshold value(s).

Moreover, at (508), the method 500 includes initiating, with the computing system, a control action associated with reducing the level of hydrogen present within the compartment when the determined at least one of the level of hydrogen present within the compartment or the rate of change of the level of hydrogen present within the compartment exceeds the associated threshold value. For example, as described above, when the determined the level of hydrogen present within the compartments 280, 282, 284, 286, 290 and/or the rate of change of the level of hydrogen present within the compartments 280, 282, 284, 286, 290 exceeds the associated threshold value(s), the computing system 354 initiates one or more control actions associated with reducing the level of hydrogen present within the compartments 280, 282, 284, 286, 290.

Further aspects are provided by the subject matter of the following clauses:

A system for detecting hydrogen leaks within a vehicle, the system comprising: a vehicle component in which hydrogen is stored or through which hydrogen flows positioned within a compartment of the vehicle; a hydrogen sensor configured to generate data indicative of a level of hydrogen present within the compartment; and a computing system communicatively coupled to the hydrogen sensor, the computing system configured to: determine at least one of the level of hydrogen present within the compartment or a rate of change of the level of hydrogen present within the compartment based on the data generated by the hydrogen sensor; compare the determined at least one of the level of hydrogen present within the compartment or the rate of change of the level of hydrogen present within the compartment to an associated threshold value; and when the determined at least one of the level of hydrogen present within the compartment or the rate of change of the level of hydrogen present within the compartment exceeds the associated threshold value, initiate a control action associated with reducing the level of hydrogen present within the compartment.

The system as in one or more of the preceding clauses, wherein the computing system is configured to: determine the level of hydrogen present within the compartment based on the data generated by the hydrogen sensor; compare the determined level of hydrogen present within the compartment to the associated threshold value; and when the determined level of hydrogen present within the compartment exceeds the associated threshold value, initiate a control action associated with reducing the level of hydrogen present within the compartment.

The system as in one or more of the preceding clauses, wherein the computing system is configured to: determine the rate of change of the level of hydrogen present within the compartment based on the data generated by the hydrogen sensor; compare the determined rate of change of the level of hydrogen present within the compartment to the associated threshold value; and when the determined rate of change of the level of hydrogen present within the compartment exceeds the associated threshold value, initiate a control action associated with reducing the level of hydrogen present within the compartment.

The system as in one or more of the preceding clauses, the control action comprises increasing a ventilation provided to the compartment.

The system as in one or more of the preceding clauses, further comprising: a ventilation device configured to control a flow of air permitted between the compartment and a location outside of the compartment, wherein, when initiating the control action, the computing system is configured to control an operation of the ventilation device such the flow of air permitted between the compartment and the location outside of the compartment is increased.

The system as in one or more of the preceding clauses, wherein the ventilation device comprises a set of louvers.

The system as in one or more of the preceding clauses, wherein the control action comprises activating a quick release panel associated with the compartment.

The system as in one or more of the preceding clauses, further comprising: an actuator configured to puncture a frangible portion of the quick release panel, wherein, when initiating the control, the computing system is configured to activate the actuator such that the frangible portion of the quick release panel is punctured.

The system as in one or more of the preceding clauses, wherein the compartment is positioned within a fuselage of the vehicle, a nacelle of the vehicle, or a core engine of the vehicle.

The system as in one or more of the preceding clauses, wherein a frangible portion of the blow panel is configured to puncture when a pressure within the compartment exceeds a predetermined pressure value.

The system as in one or more of the preceding clauses, wherein the compartment is positioned within a nacelle of the vehicle.

The system as in one or more of the preceding clauses, further comprising: a vent valve in fluid communication with the vehicle component, the vent valve configured to selectively discharge hydrogen stored within the hydrogen fuel to a location outside of the compartment, wherein the control action comprises opening the vent valve configured to discharge hydrogen from the vehicle component to reduce a pressure of the hydrogen within the vehicle component.

The system as in one or more of the preceding clauses, wherein the control action comprises halting a flow of hydrogen to the vehicle component.

The system as in one or more of the preceding clauses, wherein the vehicle component comprises at least one of a hydrogen fuel tank, a hydrogen delivery conduit, or a gas turbine engine associated with the vehicle.

The system as in one or more of the preceding clauses, wherein the vehicle component corresponds to a first vehicle compartment, the compartment corresponds to a first compartment, and the hydrogen sensor corresponds to a first hydrogen sensor, the system further comprising: a second vehicle component in which hydrogen is stored or through which hydrogen flows positioned within a second compartment of the vehicle, the second compartment of the vehicle being fluidly isolated from the first compartment; a second hydrogen sensor configured to generate second data indicative of a second level of hydrogen present within the second compartment, the second hydrogen sensor communicatively coupled to the computing system, wherein the computing system is further configured to: determine at least one of the second level of hydrogen present within the second compartment or a second rate of change of the second level of hydrogen present within the second compartment based on the second data generated by the second hydrogen sensor; compare the determined at least one of the second level of hydrogen present within the second compartment or the second rate of change of the level of hydrogen present within the second compartment to an associated threshold value; and when the determined at least one of the second level of hydrogen present within the second compartment or the second rate of change of the second level of hydrogen present within the second compartment exceeds the associated threshold value, initiate a control action associated with reducing the level of hydrogen present within the second compartment.

The system as in one or more of the preceding clauses, wherein, when the determined at least one of the level of hydrogen present within the first compartment or the rate of change of the level of hydrogen present within the first compartment exceeds the associated threshold value and the determined at least one of the second level of hydrogen present within the second compartment or the second rate of change of the second level of hydrogen present within the second compartment falls below the associated threshold value, the computing system is configured to: initiate halting of the flow of hydrogen from the first vehicle component to a downstream component; initiate isolation of the first compartment such that the hydrogen present within the first compartment remains within the first compartment; and initiate the flow of hydrogen through the second vehicle component such that the hydrogen is supplied from the second vehicle component to the downstream component.

The system as in one or more of the preceding clauses, wherein the first vehicle component comprises a first hydrogen fuel tank and the second vehicle component comprises a second hydrogen fuel tank.

A method for detecting hydrogen leaks within a vehicle, the vehicle including a vehicle component in which hydrogen is stored or through which hydrogen flows, the vehicle component being positioned within a compartment of the vehicle, the method comprising: receiving, with a computing system, hydrogen sensor data indicative of a level of hydrogen present within the compartment; determining, with the computing system, at least one of the level of hydrogen present within the compartment or a rate of change of the level of hydrogen present within the compartment based on the received hydrogen sensor data; comparing, with the computing system, the determined at least one of the level of hydrogen present within the compartment or the rate of change of the level of hydrogen present within the compartment to an associated threshold value; and initiating, with the computing system, a control action associated with reducing the level of hydrogen present within the compartment when the determined at least one of the level of hydrogen present within the compartment or the rate of change of the level of hydrogen present within the compartment exceeds the associated threshold value.

The method as in one or more of the preceding clauses, further comprising: determining, with the computing system, the level of hydrogen present within the compartment based on the data generated by the hydrogen sensor; comparing, with the computing system, the determined level of hydrogen present within the compartment to the associated threshold value; and initiating, with the computing system, a control action associated with reducing the level of hydrogen present within the compartment when the determined level of hydrogen present within the compartment exceeds the associated threshold value.

The method as in one or more of the preceding clauses, further comprising: determining, with the computing system, the rate of change of the level of hydrogen present within the compartment based on the data generated by the hydrogen sensor; comparing, with the computing system, the determined rate of change of the level of hydrogen present within the compartment to the associated threshold value; and initiating, with the computing system, a control action associated with reducing the level of hydrogen present within the compartment when the determined rate of change of the level of hydrogen present within the compartment exceeds the associated threshold value.

A system for detecting hydrogen leaks within a vehicle, the system comprising: a computing system configured to: determine at least one of a level of hydrogen present within a compartment or a rate of change of the level of hydrogen present within a compartment based on hydrogen sensor data g; compare the determined at least one of the level of hydrogen present within the compartment or the rate of change of the level of hydrogen present within the compartment to an associated threshold value; and when the determined at least one of the level of hydrogen present within the compartment or the rate of change of the level of hydrogen present within the compartment exceeds the associated threshold value, initiate a control action associated with reducing the level of hydrogen present within the compartment.

The system as in one or more of the preceding clauses, wherein the computing system is configured to: determine the level of hydrogen present within the compartment based on the hydrogen sensor data; compare the determined level of hydrogen present within the compartment to the associated threshold value; and when the determined level of hydrogen present within the compartment exceeds the associated threshold value, initiate a control action associated with reducing the level of hydrogen present within the compartment.

The system as in one or more of the preceding clauses, wherein the computing system is configured to: determine the rate of change of the level of hydrogen present within the compartment based on the hydrogen sensor data; compare the determined rate of change of the level of hydrogen present within the compartment to the associated threshold value; and when the determined rate of change of the level of hydrogen present within the compartment exceeds the associated threshold value, initiate a control action associated with reducing the level of hydrogen present within the compartment.

The system as in one or more of the preceding clauses, the control action comprises increasing a ventilation provided to the compartment.

The system as in one or more of the preceding clauses, wherein, when initiating the control action, the computing system is configured to control an operation of a ventilation device such the flow of air permitted between the compartment and the location outside of the compartment is increased.

The system as in one or more of the preceding clauses, wherein the control action comprises activating a quick release panel associated with the compartment.

The system as in one or more of the preceding clauses, wherein, when initiating the control, the computing system is configured to activate the actuator such that the frangible portion of the quick release panel is punctured.

The system as in one or more of the preceding clauses, wherein the control action comprises opening a vent valve configured to discharge hydrogen from the vehicle component to reduce a pressure of the hydrogen within the vehicle component.

The system as in one or more of the preceding clauses, wherein the control action comprises halting a flow of hydrogen to the vehicle component.

The system as in one or more of the preceding clauses, wherein, when the determined at least one of the level of hydrogen present within the first compartment or the rate of change of the level of hydrogen present within the first compartment exceeds the associated threshold value and the determined at least one of the second level of hydrogen present within the second compartment or the second rate of change of the second level of hydrogen present within the second compartment falls below the associated threshold value, the computing system is configured to: initiate halting of the flow of hydrogen from the first vehicle component to a downstream component; initiate isolation of the first compartment such that the hydrogen present within the first compartment remains within the first compartment; and initiate the flow of hydrogen through the second vehicle component such that the hydrogen is supplied from the second vehicle component to the downstream component.

The system as in one or more of the preceding clauses, wherein the first vehicle component comprises a first hydrogen fuel tank and the second vehicle component comprises a second hydrogen fuel tank.

This written description uses examples to disclose the present disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

We claim:

1. A system for detecting hydrogen leaks within a vehicle, the system comprising: a vehicle component in which hydrogen is stored or through which hydrogen flows positioned within a compartment of the vehicle; a hydrogen sensor configured to generate data indicative of a level of hydrogen present within the compartment; and a computing system communicatively coupled to the hydrogen sensor, the computing system configured to: determine the level of hydrogen present within the compartment and a rate of change of the level of hydrogen present within the compartment based on the data generated by the hydrogen sensor; compare the determined level of hydrogen present within the compartment and the determined rate of change of the level of hydrogen present within the compartment to a threshold value; and when the determined level of hydrogen present within the compartment and the rate of change of the level of hydrogen present within the compartment exceeds the threshold value, initiate a control action with reducing the level of hydrogen present within the compartment.

2. The system of claim 1, the control action comprises increasing a ventilation provided to the compartment.

3. The system of claim 2, further comprising:
a ventilation device configured to control a flow of air permitted between the compartment and a location outside of the compartment,
wherein, when initiating the control action, the computing system is configured to control an operation of the ventilation device such the flow of air permitted between the compartment and the location outside of the compartment is increased.

4. The system of claim 3, wherein the ventilation device comprises a set of louvers.

5. The system of claim 1, wherein the control action comprises activating a quick release panel associated with the compartment.

6. The system of claim 5, further comprising:
an actuator configured to puncture a frangible portion of the quick release panel,
wherein, when initiating the control, the computing system is configured to activate the actuator such that the frangible portion of the quick release panel is punctured.

7. The system of claim 6, wherein the compartment is positioned within a fuselage of the vehicle, a nacelle of the vehicle, or a core engine of the vehicle.

8. The system of claim 5, wherein a frangible portion of the quick release panel is configured to puncture when a pressure within the compartment exceeds a predetermined pressure value.

9. The system of claim 8, wherein the compartment is positioned within a nacelle of the vehicle.

10. The system of claim 1, further comprising:
a vent valve in fluid communication with the vehicle component, the vent valve configured to selectively discharge hydrogen stored within a hydrogen fuel tank to a location outside of the compartment,
wherein the control action comprises opening the vent valve configured to discharge hydrogen from the vehicle component to reduce a pressure of the hydrogen within the vehicle component.

11. The system of claim 1, wherein the control action comprises halting a flow of hydrogen to the vehicle component.

12. The system of claim 1, wherein the vehicle component comprises at least one of a hydrogen fuel tank, a hydrogen delivery conduit, or a turbine engine of the vehicle.

13. The system of claim 1, wherein the vehicle component corresponds to a first vehicle compartment, the compartment corresponds to a first compartment, and the hydrogen sensor corresponds to a first hydrogen sensor, the system further comprising:
a second vehicle component in which hydrogen is stored or through which hydrogen flows positioned within a second compartment of the vehicle, the second compartment of the vehicle being fluidly isolated from the first compartment;
a second hydrogen sensor configured to generate second data indicative of a second level of hydrogen present within the second compartment, the second hydrogen sensor communicatively coupled to the computing system, wherein the computing system is further configured to:

determine at least one of the second level of hydrogen present within the second compartment or a second rate of change of the second level of hydrogen present within the second compartment based on the second data generated by the second hydrogen sensor;

compare the determined at least one of the level of hydrogen present within the second compartment or the rate of change of the level of hydrogen present within the second compartment to a threshold value; and when the determined at least one of the level of hydrogen present within the second compartment or the rate of change of the level of hydrogen present within the second compartment exceeds the threshold value, initiate a control action for reducing the level of hydrogen present within the second compartment.

14. The system of claim 13, wherein, when the determined level of hydrogen present within the first compartment and the rate of change of the level of hydrogen present within the first compartment exceeds the threshold value and the determined at least one of the second level of hydrogen present within the second compartment or the second rate of change of the second level of hydrogen present within the second compartment falls below the threshold value, the computing system is configured to: initiate halting of a flow of hydrogen from a first vehicle component to a downstream component; initiate isolation of the first compartment such that the hydrogen present within the first compartment remains within the first compartment; and initiate the flow of hydrogen through the second vehicle component such that the hydrogen is supplied from the second vehicle component to the downstream component.

15. The system of claim 14, wherein the first vehicle component comprises a first hydrogen fuel tank and the second vehicle component comprises a second hydrogen fuel tank.

16. A method for detecting hydrogen leaks within a vehicle, the vehicle including a vehicle component in which hydrogen is stored or through which hydrogen flows, the vehicle component being positioned within a compartment of the vehicle, the method comprising: receiving, with a computing system, hydrogen sensor data indicative of a level of hydrogen present within the compartment; determining, with the computing system, hydrogen present within the compartment and a rate of change of the level of hydrogen present within the compartment based on the received hydrogen sensor data; comparing, with the computing system, the determined level of hydrogen present within the compartment and the determined rate of change of the level of hydrogen present within the compartment to a threshold value; and initiating, with the computing system, a control action for reducing the level of hydrogen present within the compartment when the determined level of hydrogen present within the compartment and the rate of change of the level of hydrogen present within the compartment exceeds the threshold value.

* * * * *